(12) United States Patent
Larsson et al.

(10) Patent No.: US 7,339,897 B2
(45) Date of Patent: Mar. 4, 2008

(54) CROSS-LAYER INTEGRATED COLLISION FREE PATH ROUTING

(75) Inventors: Peter Larsson, Solna (SE); Niklas Johansson, Järfälla (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 980 days.

(21) Appl. No.: 10/278,014

(22) Filed: Oct. 23, 2002

(65) Prior Publication Data

US 2003/0161268 A1   Aug. 28, 2003

Related U.S. Application Data

(60) Provisional application No. 60/358,370, filed on Feb. 22, 2002.

(51) Int. Cl.
*G01R 31/08*  (2006.01)
*H04B 7/212*  (2006.01)
*H04J 3/16*  (2006.01)

(52) U.S. Cl. .............. 370/252; 370/337; 370/468; 370/216

(58) Field of Classification Search .............. 370/329, 370/445, 447, 449, 450, 389, 351, 468, 395.1, 370/395.4, 395.41, 395.21, 443, 462, 252
See application file for complete search history.

(56) References Cited

U.S. PATENT DOCUMENTS

| | | | | |
|---|---|---|---|---|
| 5,751,708 | A * | 5/1998 | Eng et al. | 370/395.42 |
| 6,901,064 | B2 * | 5/2005 | Cain et al. | 370/337 |
| 6,965,851 | B2 * | 11/2005 | Tillotson | 703/13 |
| 7,079,508 | B2 * | 7/2006 | Ayyagari et al. | 370/329 |
| 7,099,277 | B2 * | 8/2006 | Sahinoglu et al. | 370/238 |
| 7,126,927 | B2 * | 10/2006 | Heijenk | 370/329 |
| 2002/0049561 | A1 | 4/2002 | Garcia-Luna-Aceves et al. | |
| 2002/0054578 | A1 | 5/2002 | Zhang et al. | |
| 2002/0075869 | A1 | 6/2002 | Shah et al. | |

FOREIGN PATENT DOCUMENTS

WO      01/50669 A1    7/2001

(Continued)

OTHER PUBLICATIONS

Lee et al, "Improving UDP and TCP Performance in Mobile Ad Hoc Networks with INSIGNIA", IEEE Communications Magazine, Jun. 2001, pp. 156-165.

(Continued)

*Primary Examiner*—Hanh Nguyen
(74) *Attorney, Agent, or Firm*—Nixon & Vanderhye, P.C.

(57) ABSTRACT

A true cross-layer integration of functions is provided on several protocol layers within a network, thus providing a unified approach to Quality of Service (QoS) provisioning in a multihop network. In the unified approach, connections are preferably determined by integrated optimization of a given objective function with respect to connection parameters on at least three protocol layers within the network. Preferably, the optimization involves routing (path selection), channel access as well as adaptation of physical link parameters. By incorporating physical connection parameters together with properly designed constraints, the issue of interference can be carefully considered. It is thereby possible to determine connection parameters that ensure substantially non-interfering communication with respect to existing connections as well as the new connection.

24 Claims, 14 Drawing Sheets

FOREIGN PATENT DOCUMENTS

WO         02/05493 A2      1/2002

OTHER PUBLICATIONS

Tsudaka et al, "Power Control Routing for Multi Hop Wireless Ad-hoc Network", GOBECOM '01, IEEE Global Telecommunications Conf., San Antonio, TX, Nov. 25-29, 2001, pp. 2819-2824.

Chen et al, "QoS Routing Performance in Multihop, Multimedia, Wireless Networks", 1997 IEEE 6th Int'l. Conf. on Universal Person Communications Record, Bridging the Way to the 21st Century, Proceedings of the ICUPC '97 Conf. Rec., San Diego, CA, Oct. 12-16, 1997, pp. 557-561.

Chunhung et al, "QoS Routing in Ad Hoc Wireless Networks", IEEE Journal on Selected Areas in Communications, vol. 17, No. 8, Aug. 1999, pp. 1426-1438.

Chiang et al, "Admission Control, Power Control and QoS Analyses for Ad Hoc Wireless Networks", ICC 2001, IEEE Int'l. Conf. on Communications, Conference Record, Helsinki, Finland, Jun. 11-14, 2001, pp. 245-249.

Aggélou et al, "QoS Support in 4th Generation Mobile Multimedia Ad Hoc Networks", 3G Mobile Communication Technologies, Mar. 26-28, 2001, Conference Pub. No. 477, pp. 412-416.

Lee et al, "Insignia: In-Band Signaling Support for QOS in Mobile Ad Hoc Networks", Proceedings of 5th Ind. Workshop on Mobile Multimedia Communication, MoMuc '98, Oct. 12-14, 1998, Berlin.

Perkins et al, Ad Hoc On-Demand Distance Vector (AODV) Routing, Mobile Ad Hoc Networking Working Group, Internet Draft, Jan. 19, 2002.

Johnson et al, "Dynamic Source Routing in Ad Hoc Wireless Networks", Computer Science Department, Carnegie Mellon University, 1996.

Chen et al, "Distributed Quality-of-Service Routing in Ad Hoc Networks", IEEE Journal on Selected Areas in Communication, vol. 17, No. 8, Aug. 1999, pp. 1488-1505.

Lin, "Multimedia Transport in Multihop Wireless Networks", IEE Proc.-Commun., vol. 145, No. 5, Oct. 1998, pp. 342-346.

Nelson et al, "Spatial TDMA: A Collision-Free Multihop Channel Access Protocol", IEEE Transactions on Communications, vol. Comm-33, No. 9, Sep. 1985, pp. 934-944.

Bao et al, "Collision-Free Topology-Dependent Channel Access Scheduling", Computer Engineering Dept., University of California.

Grönkvist, "Traffic Controlled Spatial Reuse TDMA in Multi-hop Radio Networks", Dept. of Communications Systems, Defense Research Establishment, 1998, pp. 1203-1207.

Grönkvist, "Assignment Methods for Spatial Reuse TDMA", Swedish Defence Research Establishment, IEEE, 2000, pp. 119-124.

Hsu et al, "Bandwidth Routing in Multi-hop Packet Radio Environment", pp. 1-22.

Hsu et al, "QoS Routing in Multihop Packet Radio Environment".

Lin et al, QoS Routing in Ad Hoc Wireless Networks, IEEE Journal on Selected Areas in Communications, vol. 17, No. 8, Aug. 1999, pp. 1426-1438.

Lin, "On-Demand QoS Routing in Multihop Mobile Networks", Dept. of computer Science and Engineering, National Sun Yat-Sen University, Taiwan, 1989.

Chen et al. QoS Routing Performance in Multihop, Multimedia, Wireless Networks, Computer Science Dept., University of California, 1993.

Chen et al, "On-Demand, Link-State, Multi-Path QoS Routing in a Wireless Mobile Ad-Hoc Network", National Central University, 1990.

Liao et al, "A Multi-Path QoS Routing Protocol in a Wireless Mobile Ad Hoc Network", Kluwer Academic Publishers, 2001.

Liao et al, "A TDMA-Based Bandwidth Reservation Protocol for QoS Routing in a Wireless Mobile Ad Hoc Network", Tamkang University, 1990.

Michail, "Routing and Scheduling Algorithms in Resource-Limited Wireless Multi-Hop Networks", Ph.D, Thesis, CSHCN PhD 2001-1 (ISR PhD 2001-1).

Zhu, "Medium Access Control and Quality-of-Service Routing for Mobile Ad Hoc Networks", CSHCN PhD 2002-1 (ISR PhD 2002-1).

Sánchez et al, "Reuse Adaptive Routing for Multihop Packet Radio Networks", Radio Communications Systems Lab, Dept. of Signals, Sensors and Systems, Royal Institute of Technology.

Bao et al, "Collision-Free Topology-Dependent Channel Access Scheduling", Computer Engineering Dept., University of California, 1985.

Hsu et al, "Bandwidth Routing in Multi-hop Packet Radio Environment", pp. 1-22, 1985.

Hsu et al, "QoS Routing in Multihop Packet Radio Environment", 1985.

Sánchez et al, "Reuse Adaptive Routing for Multihop Packet Radio Networks", Radio Communications Systems Lab, Dept. of Signals, Sensors and Systems, Royal Institute of Technology, 2001.

\* cited by examiner

CROSS-LAYER INTEGRATED COLLISION FREE PATH ROUTING

This application claims the benefit of Provisional Application No. 60/358,370, filed Feb. 22, 2002, the entire content of which is hereby incorporated by reference in this application.

TECHNICAL FIELD OF THE INVENTION

The present invention generally relates to Quality of Service (QoS) support in communication networks such as wireless multihop networks, and more particularly to determination of connection parameters, connection set-up as well as connection admission control in such networks.

BACKGROUND

When routing is applied in a wireless network, such a network is often denoted a multihop network. In a multihop network, nodes out of reach from each other can benefit from intermediate located nodes that can forward their messages from the source towards the destination. Traditionally, multihop networks have been associated with so called ad hoc networks where nodes are mostly mobile and no central coordinating infrastructure exists. However, the idea of multihop networking can also be applied when nodes are fixed. One such scenario targets rural area Internet access and uses fixed nodes attached to the top of house roofs, lamp posts and so forth.

Although some research has been ongoing in the area of multihop since the early 1970's, relatively few of those research efforts have been directed towards QoS provisioning for multihop networks. The reason being that QoS support in multihop networks is considered to be of immense complexity. Unpredictable mobility, seemingly randomly changing traffic patterns, unreliable wireless channels, computational complexity as well as other detrimental effects are the cause of this view. Yet some researchers have tried to tackle the QoS challenge for multihop networks. The most interesting and promising research in this area have focused on using some sort of slotted TDMA (Time Division Multiple Access) like MAC (Medium Access Control) structure as a basis.

The state-of-the-art with respect to multihop networks providing collision free channels, enabling QoS routes to be established between a source node and a destination node, will now be described below. These kinds of protocols are often referred to as QoS routing protocols. As opposed to general routing protocols, QoS routing requires not only to find a route from a source to a destination, but the route must also satisfy the end-to-end QoS requirements, often given in terms of bandwidth and/or delay, e.g. to support real-time multimedia communication. The state-of-the-art QoS routing protocols might be divided into two different groups, henceforth referred to as separated channel access and routing schemes and integrated channel access and routing schemes. In the former group, the task of routing and channel allocation is separated into two different algorithms, i.e. first a route is found and thereafter the channel allocation is performed, whereas the second group takes a more or less integrated approach to channel allocation and routing.

For a better understanding of the QoS routing schemes of the prior art, it may be useful to begin with a brief overview of the OSI (Open Systems Interconnect) model for networking. The OSI model includes seven different protocol layers: the physical layer (1), the link layer (2), the network layer (3), the transport layer (4), the session layer (5), the presentation layer (6) and the application layer (7). The physical layer, which relates to the physical aspects of networking such as transmission media, transmission devices and data signals, is sometimes not seen as a protocol layer. For simplicity however, all layers will be referred to as protocol layers. Among other things, the link layer establishes and maintains links between communication devices and controls access to the network medium. The main responsibilities of network layer include switching, routing and gateway services. The transport layer is responsible for delivering frames between services on different devices. The session layer manages dialog control and session administration. The presentation layer is responsible for the presentation of data, and the application layer is concerned with the provision of services on the network and provides an interface for applications to access the network.

Separated Channel Access and Routing Schemes

The separated QoS routing protocols use generic QoS measures and are not tuned to a particular MAC layer, i.e. layer 2. In order to be able to guarantee that the QoS requirements are fulfilled, these protocols have to be enhanced with a MAC protocol providing collision free access to the channel.

Insignia

INSIGNIA [1] is an end-to-end IP based in-band-signaling framework for providing QoS in ad-hoc networks. In-band signaling means that every packet carry all information needed to establish a reservation. The QoS mechanism is independent of both the ad-hoc routing protocol used (reference is made to for example [2] or [3]) and the link layer technology, although the final received QoS will heavily depend upon these features. The operation of the framework may be described as follows: A route from the source to the destination is found by the ad-hoc routing protocol on layer 3. Since every packet carry the necessary information to reserve the necessary bandwidth, data packets may start to traverse the route as soon as it has been established which leads to fast reservation. When a node on the route from the source to the destination receives a packet from a flow for which it has not reserved capacity (indicated by one bit in the header), it reserves the requested capacity if possible.

Ticket Based Probing

As was the case for INSIGNIA, Ticket Based Probing (TBP) [4] is a pure layer 3 protocol in that all signaling is performed on this layer and that it needs the support of layer 2 (MAC) to decide whether a reservation may be accepted or should be rejected. TBP however is a true ad-hoc routing protocol. The main aim in reference [4] is to localize the search for feasible paths between source and destination to just a portion of the network instead of flooding the whole network as is usual in ad-hoc routing protocols. More specifically, they want to search only a small number of paths from source to destination, instead of making an expensive exhaustive search. This is achieved by issuing tickets. A ticket is the permission to search one path and hence, the maximum number of paths searched is bounded by the number of tickets. When an intermediate node on the path from source to destination receives a ticket it has to decide to which node(s) the ticket should be forwarded. To do this, the node uses state information to guide the limited packets along the best routes. A distance vector protocol is used to gather this state information which consists of end-to-end delay, bandwidth and cost.

Examples of Conflict Free Scheduling Algorithms

In [6], Nelson and Kleinrock introduced the concept of Spatial TDMA (STDMA), where timeslots (TS) are spatially reused. This work may be regarded as the father of all other scheduling algorithms aiming at providing conflict free schedules. The idea is to determine sets of non-interfering (or non-colliding) links. This assumes a stationary network, and the sets need to be recalculated if the network changes sufficiently. Those sets are preferably selected such that it allows each node in the network to transmit at least once. Each timeslot in a TDMA frame is then assigned a set of links (transmission sets) that can transmit without interfering each other. The same schedule is subsequently repeated each STDMA frame.

The scheme(s) presented in [8] and [9] could be viewed as a direct offspring of STDMA. In previous works on STDMA, the connectivity of the network graph is used to decide if interference occurs. Such an approach does not capture the total interference in the network. Instead, in the scheme(s) of [8] and [9], the generation of STDMA schedules is based on the SIR value for each link.

STDMA and its offspring are pretty much designed for off-line or centralized calculation of the transmission sets. In ad hoc networks, this is not a sensible approach. A particular layer 2 scheme, which ensures distributed and collision free operation, called Collision-Free Topology-Dependent Channel Access Scheduling or CTMA in short is presented in [7].

"Integrated" Channel Access and Routing Schemes

The "integrated" QoS routing algorithms are based on the assumption that the ad hoc network may be modeled as a graph, and all of them are on-demand protocols, i.e. the route search is only done after a route have been requested from a higher layer protocol. Furthermore, conventional integrated QoS routing algorithms generally assume TDMA, fixed transmit power and omni-directional antennas. In a graph, two nodes are called neighbors if they are able to communicate with one another and this is represented by connecting the two nodes with a link in the graph model. Two nodes are connected if the distance between them does not exceed some predetermined value; i.e. packets are received without error in absence of external interference from other nodes. It is also assumed that only neighbors are interfering with one another. In a multihop packet radio network modeled with graphs, transmissions are often modeled to interfere in two ways, henceforth referred to as primary interference and secondary interference. Primary interference occurs when the node is supposed to do more than one thing in a single timeslot, for instance transmit and receive in the same timeslot. Secondary interference occurs when a receiver R tuned to a particular transmitter T is within range of another transmitter whose transmission, though not intended for R, interfere with the transmission of T at R. When using a graph model, it is sufficient to prevent all neighbors of R transmitting in the same timeslot as T to avoid secondary interference. When describing the various integrated QoS routing protocols below, they have been classified according to what level of interference they are considering—interference free channel, only primary interference considered and both primary and secondary interference considered, since this highly affects the way the protocol is designed.

Most existing ad hoc routing protocols are only concerned with the existence of a shortest path route between two nodes in the ad hoc network without guaranteeing its quality. As previously described, the aim for ad hoc QoS routing protocols is to set up a path/channel from a source node to a destination node fulfilling some requirements regarding bandwidth and/or delay to be able to support real-time multimedia communication. To do this, conventional integrated QoS routing protocols normally consider the bandwidth on a link when searching for a route from source to destination. The bandwidth requirement is then realized by reserving time slots on the links on the path. The main advantage of this approach, when compared to ordinary ad-hoc routing protocols, is that the QoS requirements can be fulfilled. Compared to completely separated QoS routing protocols, this means that QoS provisioning can be achieved with a better network utilization.

To calculate the available bandwidth in this environment, it is incorrect to simply compute the minimum bandwidth of the links along the path as is done in wireline networks. The cause of this is that the available bandwidth is shared among the neighboring nodes. A simple example of this is the following where only primary interference is considered: Suppose node A wants to communicate with node C via node B. The available free slots for A to communicate with B is 1, 2, 3 and 4 and the same holds for the link from B to C. If this would have been a wireline (or an interference free channel) network the available capacity would have been 4 slots, whereas in this case the capacity is 2 slots. The reason for this is that the intersection of common free slots on links A to B and B to C is not an empty set and a node is not able to both transmit and receive in the same slot. Further, assume that the available free slots to communicate from A to B and B to C are 1, 2, 3 and 4 as well as 3 and 4 respectively. If slots 1 and 2 are reserved for communication from A to B and slots 3 and 4 for communication from B to C, the available bandwidth from A to C is 2. On the other hand if slots 3 and 4 are reserved for communication from A to B it will mean that no communication may take place from B to C and the available bandwidth from A to C would have been 0 in this case. Protocols that are able to pinpoint this problem and solve it will be said to be able to perform optimal scheduling henceforth. There are two problems involved in this path bandwidth computation process. The first problem is how station B (here it is assumed that B is responsible for reserving capacity on the link from A to B) knows the set of common free slots of two adjacent links, and the second problem is how to share this information with its neighbors. To solve these problems, the stations have to exchange some messages with each other.

Interference Free Channel

Reference [16] describes a multi-path QoS routing protocol that is based on the ticket based approach presented in [4]. The expression "multi-path" refers to the case where the reserved capacity from source to destination may be split into several subpaths, each serving part of the original requested capacity. However, this work is assuming quite an ideal model in that the bandwidth of a link may be determined independently of its neighboring links. To support this assumption, it is assumed that each host has multiple transceivers that may work independently of one another and that each link is assigned a code that is distinct from those codes used by its two-hop neighbors to avoid collision. A two hop neighbor is a neighbor of a neighbor—in the example above A and C are two hop neighbors.

Only Primary Interference Considered

A less stringent assumption than interference free channel is made in [12], [13] and [15], where a CDMA-over-TDMA channel model is assumed, implying that the use of a time slot on a link is only dependent of the status of its neighboring links (i.e. they only consider primary interference).

The focus in these three references is the calculation of the available bandwidth on the path from source to destination but the way the required information is gathered differs.

The general operation of [12] and [13] will now be described briefly. On receiving an RREQ (Resource REQuest) the bandwidth is calculated from the source to this node. The bandwidth may be computed in an optimal way since information is exchanged with its neighbors about the available free slots prior to the calculation of the available bandwidth and that the RREQ message includes the slots used for the previous link on the path from the node to the source. The RREQ is dropped if the result does not satisfy the QoS requirement. As is to be expected the destination will receive more than one RREQ each indicating a unique feasible path from source to destination. The destination will choose one of the paths and issue an RREP (Route REPly) message. As the RREP message traverses back to the source, each node along the path reserves those free slots which were calculated in advance.

In [5], a protocol for QoS routing in an IEEE 802.11 network is presented that utilize the bandwidth calculation algorithms described above.

In [15], instead of calculating the available bandwidth hop-by-hop, each RREQ packet records all link state information from source to destination. In this way the destination is able to calculate the best path from source to destination and issues a RREP message along the chosen path. An option for multipath routing is also presented in the reference and is easily achieved since the destination has all information of all available paths from source to destination. The algorithm proposed in [15] targets a flow network; i.e. supports multiple different flows. It is the task of the destination node to determine the flow network from the source that fulfils the bandwidth requirement. Although such a solution has the potential to provide a close to optimal route, interference being neglected, it also put immense computational burden on the destination node.

Both Primary and Secondary Interference Considered

Cluster Based

In the cluster-based networks described in [10], [11], [14] and [18], a node could be a cluster head, a gateway or just a usual node. Once a node is chosen as a cluster head, all its neighbors belong to the same cluster. A node that belongs to two or more clusters plays the role of a gateway. CDMA is used to partition the clusters by assigning different code sequences to different clusters, and TDMA is enforced within a cluster. By doing so they claim that secondary interference only have to be considered within the cluster, since it is assumed that the interference in between clusters is negligible. To spread the information of available slots within the cluster every node periodically transmits a "free-slot" message that contains its slot reservation status. Since the cluster head can hear all other nodes in the cluster, it has complete knowledge of the reservation status in the cluster. Since the cluster head, as all nodes in the cluster, is obliged to transmit the "free slot" message all nodes will eventually know the slot reservation within the whole cluster. This makes the computation of available bandwidth simple. The available bandwidth computation and signaling is then carried out independently at each node on a hop-by-hop basis.

The scheme proposed in [18] is not really an integrated approach. Instead, a hierarchical scheme is proposed—first capacity allocation is made both at the node (link) level and at the flow level (in both these steps fixed routing is assumed), then a distributed version of the Bellman-Ford algorithm is used for the final route selection. It is assumed that every node's allocated slots get assigned to the appropriate portion of the time frame by some mechanism, but the MAC layer is not considered. Further, it is required that one central entity gathers all the information, performs the calculations and then distributes the final result, i.e. it is a centralized approach.

In the references [17] and [19] mentioned below, an ordinary TDMA/slotted structure is assumed and hence the protocols will have to consider both primary and secondary interference with regards to all nodes in the network.

Liao

The scheme presented in [17] requires that a node first of all have to know the partial graph of its own locality (this means that a node has to know how its neighbors and neighbor's neighbors (usually referred to as 2-hop-neighbors) are interconnected). Further, a node also has to have complete knowledge of the slots that the neighbors are receiving and transmitting in (note, it is not enough to know if the node is busy or not). This also holds for its 2-hop-neighbours. In order to create these data structures, a host needs to periodically broadcast this information to its neighbors and these have to rebroadcast this to their neighbors. With this information it is possible to perform the routing and slot allocation. The rule is (as in most other papers) that a slot may only be allocated if the two nodes commonly indicate a slot as free and that the sending node does not interfere with any of its neighbors. Note this scheme is not able to compute the optimal path bandwidth.

Zhu

The scheme presented in [19] resembles some of the approaches that only consider primary interference, but is not able to calculate the available bandwidth optimally. Nothing is said about how a node knows which slots it is permitted to send in with respect to secondary interference with other nodes not on the path from source to destination. It is merely stated that it is the job of the underlying slot assignment protocol at the MAC layer to determine bow the nodes negotiate with each other to ensure that slots are assigned to the corresponding transmitters and are respected by their neighbors.

Additional State-of-the-art Solutions

In [20], a graph model is built up by assuming that two nodes are connected if the distance between them does not exceed some predetermined value, i.e. packets are received without error in absence of external interference from other nodes. A relatively realistic model on secondary interference is used. Two or more stations may transmit in the same time slot provided that the Signal-to-Interference Ratio (SIR) in all receiving nodes is above a certain threshold. The routing decision is based on minimum hop connections between source-destination pairs. Given a network topology (depicted by the graph model) the number of hops and possible paths may be found by broadcasting a packet through the network and counting the number of nodes visited. When multiple paths with equal number of hops between source and destination is found previous slot assignments and relative traffic load are used as decision criteria, so as to accomplish load balancing in the network. By doing so congestion is less likely and the throughput may be increased. In short, the algorithm that follows five steps may be described as follows. In the first step, the graph model is used to derive the network topology. Next, a routing decision is used to produce balanced traffic between links taking into account the available capacity. Since capacity for each link is required for this routing decision, equal link capacity is considered at this step. In the third step, any conflict free scheduling algorithm, such as for example [8], may be used to generate the schedule. After this, the routing decision is taken again (fourth step), but this time based on the actual capacity given by the schedule. In the final step, the routing decision (step two or four) that produced maximum throughput for the whole network is chosen. Reference [20] is actually based on sequential and thus separated routing and scheduling/reservation. It should also be pointed out that this scheme requires a centralized path and resource assignment determination.

References [21-22] are not related to the issue of routing on the network layer, but rather concern adaptive wireless communication, with parameters on the physical layer and the MAC layer being adaptively modified by a base station controller.

Problems Associated with the State-of-the-art Solutions

The separated channel access and routing schemes are generally far from optimal. The reason is simply that the problem of assigning routes and channel resources has been subdivided into two simpler problems. In addition, the separated schemes often assume off-line and centralized determination of path and resource assignments. This means that they are relatively poor at handling mobility, as information must be collected, processed and subsequent results disseminated to involved nodes.

Although several good ideas for some form of "integrated" channel access and routing have been presented, important radio aspects are entirely neglected. Therefore, the usefulness of the algorithms can be questioned. For instance, an overly simplistic assumption that nodes uses orthogonal codes so no transmitting node interfere with any other receiving node is used in several of the papers. It is not just incorrect, as in practice codes are not perfectly orthogonal due to e.g. delay spread and hence will cause detrimental interference, but it is also an inefficient use of valuable resources. The orthogonality of signals is a result of a bandwidth (BW) expansion, and the bandwidth could probably be used better through sending data at higher rates. The path and resource assignment procedure proposed in conventional "integrated" channel access and routing schemes is also very much simplified and may sometimes advice routes that are not feasible in practice.

BRIEF SUMMARY

It is a general object of the present technology to improve the utilization of the available resources in a communication network.

It is also an object of the technology to provide a robust and efficient mechanism for QoS support in communication networks such as wireless multihop networks. In this respect, it is desirable to exploit the full potential of the network, while ensuring the quality of service.

Another object of the technology is to provide substantially non-interfering or collision-free communication for each individual connection, at least in a given subset of the network.

Yet another object of the technology is to provide an improved method and corresponding control system for connection set-up in a communication network such as a wireless multihop network.

Still another object of the technology is to provide an improved method and corresponding control system for determining a connection in a communication network such as a wireless multihop network.

It is also an object of the technology to provide an improved method and corresponding control system for connection admission control in a communication network such as a wireless multihop network.

Another object of the technology is to provide a communication network having a plurality of network nodes, at least one of which includes means for improved determination of a connection.

It is also an object of the technology is to find ways of controlling the computational complexity involved in determining the proper connection parameters.

A cross-layer integration of functions is provided on several protocol layers of the network into a single unified mechanism by means of integrated optimization of a single objective function with respect to connection parameters on at least thee protocol layers.

Preferably, the involved protocol layers include the network layer, the link layer and the physical layer. It should though be understood that other protocol layers can be used in the integrated optimization. It is also possible to use more than three protocol layers in the optimization, for example by considering the thee lowest levels in combination with an adaptive application on the application layer. In effect, the unified approach partially or completely eliminates the need for a layered representation. Instead of having several separate optimization algorithms executing more or less independently on the different protocol layers, a single unified optimization is performed.

In a preferred example embodiment, routing, channel access, physical layer functions and optionally also admission control are integrated into a single, unified mechanism by using connection parameters including path, channel and one or more physical layer/link parameters in the integrated optimization. In this case, each connection is consequently defined by at least a triplet comprising a selected path, a selected channel and one or more physical layer/link parameters.

In order to provide collision-free or non-interfering communication, the optimization is subjected to one or more constraints designed to ensure substantially non-colliding communication with respect to existing connections as well as the requested connection.

By incorporating physical layer connection parameters in the integrated optimization and performing the optimization under one or more interference-related constraints, the issue of interference can be carefully considered also in a unified approach to QoS provisioning in networks such as wireless multihop networks. This means that it is possible to determine connection parameters that ensure substantially non-interfering links, including also the links of the requested connection.

In practice, the objective function may include terms such as link transmit power, delay, local load, battery power and link margin. The physical layer parameters typically define the link operation and include one or more physical link parameters such as transmit power, modulation parameters, bandwidth, data rate, error correction parameters, and so forth. Other physical link parameters include multiple-input-multiple-output (MIMO), adaptive antenna (AA) and other multiple antenna configuration parameters, on the transmission side, the receiving side or both.

Advantageously, the integrated optimization is performed by means of a heuristic algorithm. The connection parameters may for example be determined in a local search procedure. In this respect, it has also turned out to be useful to work with a nested algorithm, where each nesting level represents a network protocol layer.

In a special example embodiment, the horizon over which the algorithm acts is made selectable to provide optimum performance for a given acceptable level of computational complexity.

In addition to a centralized implementation, in which a unique predefined unit determines connections on request, it is also possible to distribute the optimization algorithm to a plurality of network nodes in the network, using RREQ (Resource REQuest) and RREP (Route REPly) signaling for transfer of required information. In the distributed scenario, for a given connection request, the optimization algorithm may be executed in the relevant network nodes on a node-by-node basis, or executed entirely in the destination node using information collated in an RREQ that has been forwarded through the network.

The considered networks are mainly wireless (radio, optical, etc.) multihop networks, but the technology can also be applied in other networks such as multiple access networks formed as hybrids of wireless and wired technologies.

It should be understood that the term "channel" includes time slots, frequency bands, orthogonal codes, or any other orthogonal channel or combination thereof, even non-slotted channels.

In summary, the present technology is concerned with QoS provisioning in communication networks such as wireless multihop networks, but also targets efficient usage of the wireless medium while ensuring use of low complexity path finding algorithms. The proposed algorithms are not limited to the stationary case of a fixed node scenario, but can under certain circumstances handle low or moderate mobility.

The technology offers the following advantages:

High network utilization;
Efficient QoS support and provisioning, including guaranteed delay and throughput;
Substantially collision-free communication;
Low computational complexity given the performance gains and the combinatorial complexity of the optimal solution;
Flexible control of the computational complexity;
Reduced power consumption, when transmit power is used in the objective function;
Reduced end-to-end delay, when delay is used in the objective function;
Both distributed and centralized implementations are feasible; and
Enables selection of near or, at very low load, actual shortest path.

Other advantages will be appreciated upon reading of the below description of the example embodiments.

BRIEF DESCRIPTION OF THE DRAWINGS

The invention, together with further objects and advantages thereof, will be best understood by reference to the following description taken together with the accompanying drawings, in which.

DETAILED DESCRIPTION OF EMBODIMENTS

Figures 1, 2:
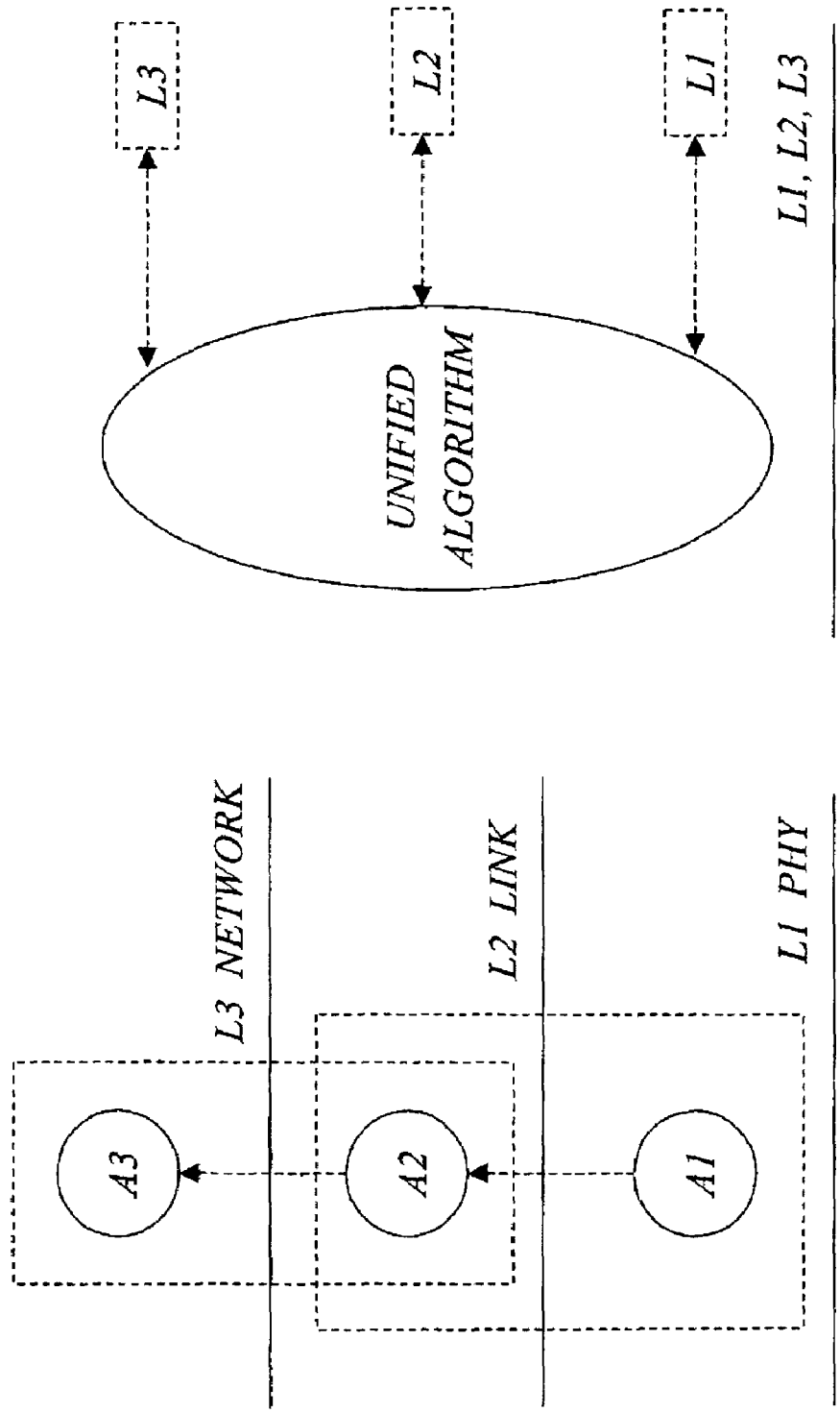
FIG. 1 is a schematic diagram illustrating the routing and channel access schemes according to the prior art.
FIG. 2 is a schematic diagram illustrating the unified approach according to an example embodiment.

Routing and channel access schemes will first be summarized with reference to FIG. 1. In conventional schemes for routing and channel access, each protocol layer is generally associated with its own independent algorithm A1, A2, A3. Sometimes abstraction data may be sent from a lower layer to a higher layer to provide some form of "soft" or sequential cross-layer integration. Abstraction data from the lower layer is simply transferred to the higher layer for use by the higher-layer algorithm, with no feedback towards the lower-layer for adaptation. For example, abstraction data concerning link bandwidth may be transferred from the link layer, L2, to the routing algorithm A3 on the network layer L3. The bandwidth information may then be used by the routing algorithm, which for example may change path assignment if the bandwidth is too low. This approach of using several independent algorithms, each being concerned with its own objective function, represents a relatively simple form of cross-layer integration that only provides suboptimal results, if feasible paths can be produced at all. A careful analysis of conventional schemes for integrated channel access and routing also reveals that they all operate only on two protocol layers and that they often completely neglect the issue of interference and therefore provide suboptimal routes and do not exploit the networks full potential.

References [23-25] are all U.S. Patent Application Publications published after the filing date of the U.S. Provisional Patent Application No. 60/358,370 on which the present patent application is based.

Reference [23] describes routing for ad-hoc internetworking based on link quality measures transferred from the link layer.

Reference [24] describes a cellular network with channel-adaptive resource allocation based on a minimum-distortion or minimum-power criterion, taking time-varying wireless transmission characteristics into account.

Reference [25] describes the use of a media abstraction unit for integrating link-layer management with network layer management. Various transmission parameters are modified in response to changing environmental factors, and this modification changes the available link bandwidth, which in turn is used at network layer traffic management.

The references [23-25] merely represent different variants of "soft" cross-layer integration, involving at most two protocol layers at a time with abstraction data being transferred from a lower layer to a higher layer.

As schematically illustrated in FIG. 2, a unified algorithm is provided or integrated optimization of a single objective function with respect to connection parameters on at least three protocol layers, preferably including the layers L1, L2, L3, thus providing a truly integrated and unified approach to routing, channel allocation and physical link parameter adaptation. Instead of having separate optimization algorithms executing more or less independently, a single unified optimization is performed. As previously mentioned, the unified approach may actually eliminate the need for a layered representation, although there is nothing that prevents that other optional functions, represented by dashed boxes in FIG. 2, still reside on the network layer L3, link layer L2 and the physical layer L1. These functions may or may not be cooperating with the unified algorithm.

The technology will now be described with reference to a particular communication network, namely a wireless (radio, optical, etc.) multihop network. It should though be understood that the invention is not limited thereto, but can also be applied in other networks such as multiple access networks formed as hybrids of wireless and wired technologies.

Basic Principles and Network Overview

As mentioned above, a true cross-layer integration of functions is provided on several protocol layers in the network, thus providing a unified approach to QoS provisioning in a multihop network. In the unified approach according to the invention, connections are preferably determined by integrated optimization of a given objective function with respect to connection parameters on at least three protocol layers within the network.

Figure 3:
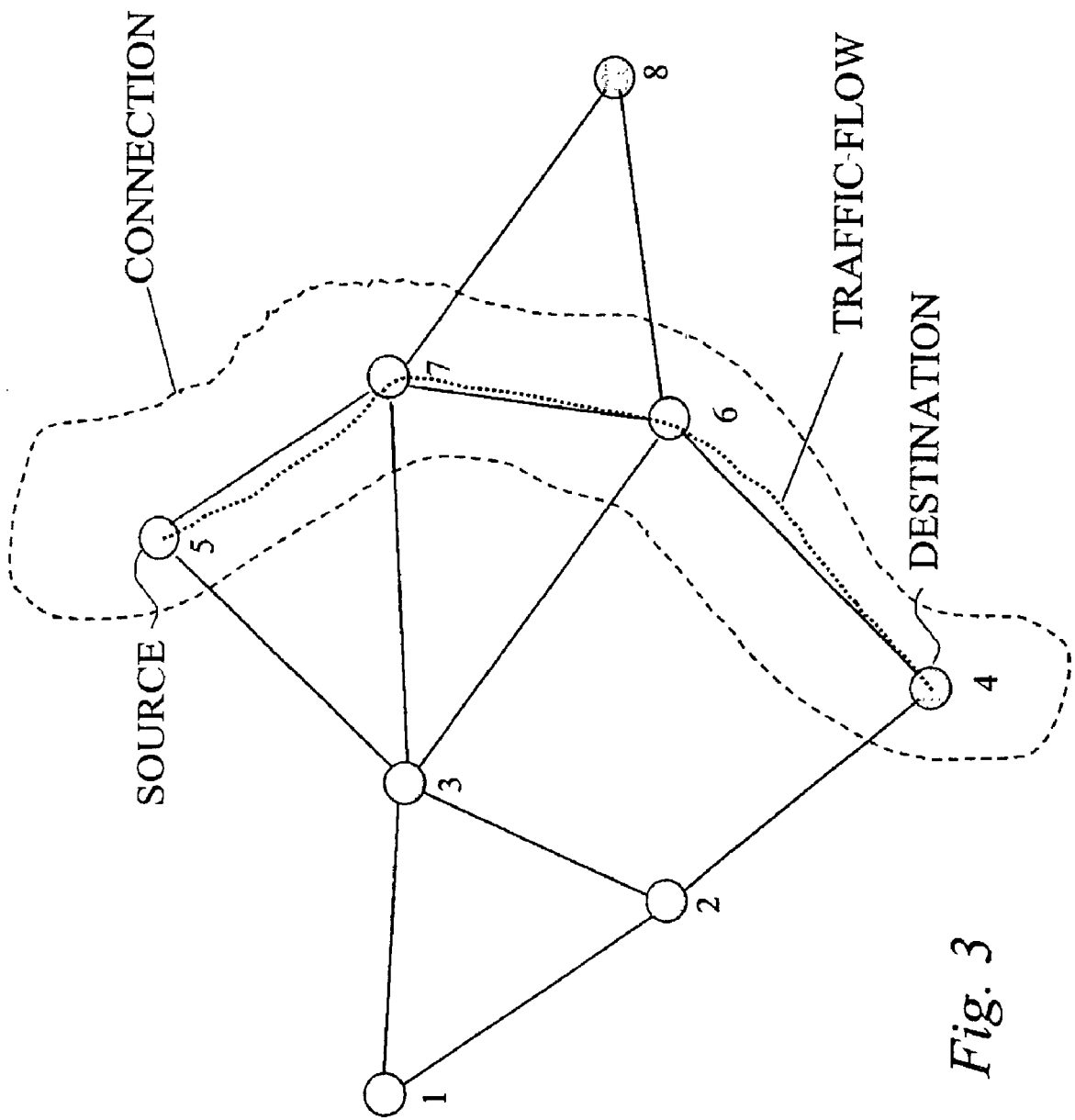
FIG. 3 is a schematic diagram of an exemplary wireless multihop network.

For a better understanding, it will be useful to begin with a brief overview of an exemplary wireless multihop network. FIG. 3 is a schematic diagram of an exemplary wireless multihop network illustrating some important concepts. It is assumed that we have a network comprising multiple nodes. The network operates in a wireless medium where transmissions potentially may interfere with each other. The traffic sent between two nodes in the network is called a flow. The sender of data in such flow is called a source node and the receiver is called a destination node. At each instant, the network carries zero, one or a multitude of traffic flows. Each flow is carried in a connection (also known as a circuit from classical networking). For simplicity, only a single connection is shown in FIG. 3. In practice, of course, several simultaneous connections may exist.

A connection from a source node to a destination node is defined by a number of connection parameters, including path, as well as channel parameters and physical layer parameters along the path. There may be several different paths from source to destination. Each path is assembled by a set of links, and each link between two adjacent nodes i and j may use several different communication channels and physical link parameter settings. A path may be characterized by the identities of the nodes.

The physical layer parameters, also referred to as physical link parameters, may be associated with the transmitting side and/or the receiving side of each node along the path. Physical link parameters for transmission may for example be transmit power, modulation and so forth. Link parameters for reception may include tuning of antenna arrays. Communication on separate channels is assumed to be entirely orthogonal and hence can not interfere with each other. Changing from one channel to another in a relay node is called channel switching. A connection typically has an upper data rate limit, and a flow may use a fraction of the available data rate or the full bandwidth. Nodes within reach of each other are generally said to be neighbors. Obviously, several definitions of the term "within reach" are possible. Preferably, the condition for being within reach of a node is that average Signal-to-Noise Ratio (SNR) at reception exceed a predetermined level when maximum permitted transmit power is used at the sending station and no interfering stations exist.

It is desirable to determine connection parameters that are optimal in some sense. In order to be able to speak about optimality in a well-defined manner, an objective function $f$ is introduced. In general, the objective function $f$ is carefully selected and made dependent on connection parameters such as path, channel and physical layer parameters. Even though physical layer/link parameters normally form part of the objective function, other non-physical layer/link factors, such as local load or remaining battery, could be incorporated into the objective function. The objective function is then optimized with respect to the relevant connection parameters, thereby jointly determining optimal connection parameters for a connection. The term parameter is used both for representing a variable parameter as such, and a corresponding parameter value, as readily understood by the skilled person.

When formalizing the optimization, the following notations may be used:

$\Omega$ denotes all nodes in the network (or the considered part of the network).

M denotes the set of orthogonal channels in total.

$\psi$—denotes one or a multitude of physical layer parameters, and may thus be multidimensional with respect to physical layer parameters, each variable parameter as such having a definition space in which it may assume continuous or discrete values.

In optimizing the objective function $f$, using input parameters from the above sets $\Omega$, M, and $\psi$, actual connection parameters defining the connection, including path, channel and physical layer parameters are obtained:

R defines the actual nodes between source and destination:

$$R = \arg_{\Omega} \left\{ \opt_{\Omega,M,\psi} \{f\} \right\}.$$

$S_u$ defines the set of channels that node u utilizes for transmission:

$$S_u = \arg_{M(u)} \left\{ \opt_{\Omega,M,\psi} \{f\} \right\},$$

where M(u) is the set of optimal channels for node u, and node u belongs to the path R, except the destination node.

$T_{u,v}$ defines the set of parameter values for node u on channel v, and may include transmission and/or reception parameters, except for the source node (only transmission parameters) and the destination node (only reception parameters):

$$T_{u,v} = \arg_{\substack{\psi(u,v) \\ v \in M(u)}} \left\{ \opt_{\Omega,M,\psi} \{f\} \right\},$$

where $\psi(u,v)$ is the optimal set of parameters in node u for channel v, and v belongs to M(u), and node u belongs to the path R.

The fact that a single objective function is optimized with respect to path, channel and physical layer parameters actually results in a true cross-layer integration of routing on the network layer, channel allocation on the link layer as well as physical layer functions into a single unified mechanism.

When subjected to properly designed constraints, the cross-layered optimization results in a network having one or a multitude of connections assigned in such a way that substantially collision-free communication is guaranteed for each individual flow. In reality, fully collision-free communication is not possible. However, collision-freedom may be practically defined as keeping any relevant performance measure such as PER (Packet Error Ratio), CIR (Carrier-to-Interference Ratio, noise assumed to be included) or SNR (Signal-to-Noise Ratio) below certain target values or within predetermined target intervals. For example, collision-free communication may be defined as fulfilled as long as the packet losses caused by interference and other detrimental radio effects are kept arbitrarily small.

The optimal solution to such cross layer integration is very computationally complex. For example, just selecting path and channels in a multiple access scheme such as TDMA or FDMA is well known to be a so-called NP-complete problem (the run-time is non-polynomial, i.e. often denoted as exponential, in the size of the input). Incorporating additional functions such as physical link parameter optimization complicates the matter even worse.

The overall strategy is to manage QoS provisioning and admission control on a per flow basis, similar to what has been described for conventional integrated routing and channel access schemes. However, several additional novel aspects are also taken into account here.

Figure 4:
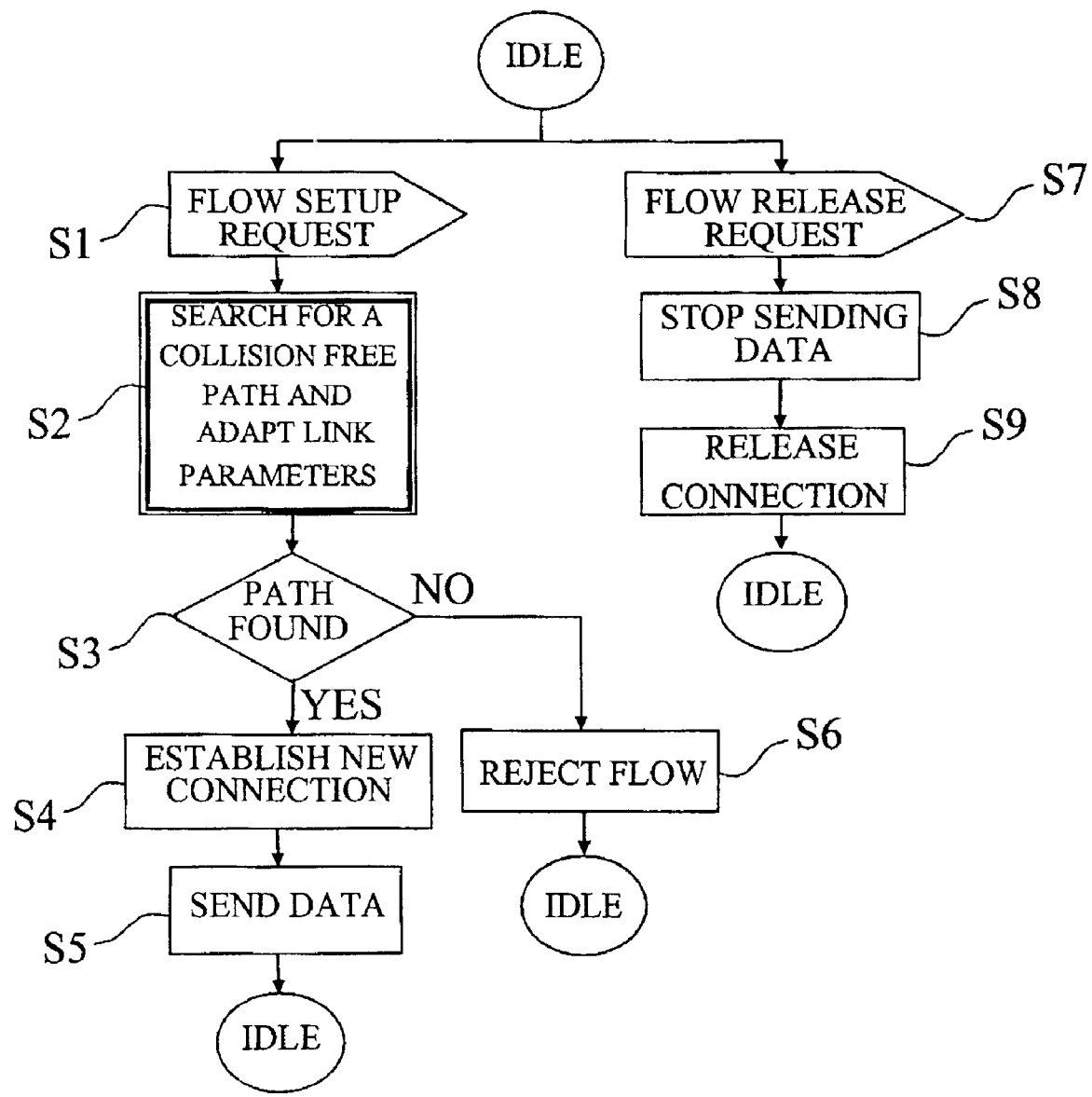
FIG. 4 is a flowchart of connection setup, reject and tear down.

The overall strategy will now be described with reference to the flow diagram of FIG. 4. When the first flow is to be established in a network upon a setup request (S1), a connection that is optimal in some sense should be selected. Preferably, this involves selecting a path, channel and a set of physical link parameters such that the connection is collision free (i.e. not affected by its own transmission) and optimizes a predetermined metric (S2). Connection admission control may be exercised by using information on whether or not a feasible path is found (S3). If a feasible path is found, the connection is established (S4) and the data is sent (S5). For each additional flow that is established, the procedure is repeated, but it is also ensured, with high probability, that the new connection does not cause collisions for or experience collisions from existing connections. In the event that a requested connection can not be setup because of the constraints to which the optimization is subjected, the flow will not be admitted into the network (S6). The action of the user in such case is not the main focus, but could typically involve a re-initiated connection setup with lower QoS requirements (e.g. reduced data rate if supported) or a deferral of the setup to a later moment when network load may be lower. An additional alternative is that the destination may have been able to derive information on maximum available QoS during the setup phase. This information can then be forwarded to the source to guide it in a new setup. If permitted by the source, the destination could also reserve a path that does not fully meet the optimum QoS requirements.

Upon a flow release request (S7), sending of data is terminated (S8). When flows are terminated, the corresponding network resources and the wireless medium are released (S9), thereby leaving space in the medium and increasing the probability that new connections can be established whenever needed.

In the process of determining a connection, physical layer parameters are thus preferably selected such that a sufficient margin for reliable operation can be maintained, while ensuring that existing connections as well as the preliminary part of the new connection are not interfered with. Preferably, the physical layer parameters are physical link parameters, selecting suitable transmit and/or receive parameters for each link. Hence, the adaptation of transmit and/or receive parameters may therefore affect the path taken. Reciprocally, the path taken affects the adaptation of transmit and receive parameters.

A connection is thus preferably set up on demand whenever required, with all connection parameters such as {path, channel, and physical link parameters} being selected wisely to ensure non-interfering or non-colliding links, including the preliminary connection's own chain of links. In other words, in this example embodiment we are dealing with event-driven connection set-up with path, channel and link parameter selection.

Various data rates may also be supported in the network as well as mechanisms enabling scaling of the data rates. An important advantage is efficient resource utilization, which may be interpreted as reduced blocking probability for any given load.

Depending on the selected objective function, the optimization may be a minimization or maximization. In a preferred example embodiment, the overall objective of the optimization is to minimize an objective cost function.

Advantageously, the optimization is performed by means of a heuristic algorithm, for example by determining connection parameters in a local search procedure. More specifically, the objective function problem may be formulated as a coupling of node specific objective functions. It has also turned out to be useful to work with a nested algorithm.

The technology will now be described with reference to a particular example of a nested optimization algorithm aimed at minimizing cost.

Example of Algorithm for Path, Channel and Link Parameter Determination

The idea is to span a directed tree with preliminary paths for the pending connection rooted at the source node. Once the algorithm has stabilized, the route connecting the source and destination node is selected. The algorithm therefore includes a search procedure for finding the least cost $K_i$ to each node i, in a given set, from the designated source node according to the following algorithm, generally denoted the CFPR (Collision Free Path Routing) algorithm:

$$K_i = \min_{j \in N(i)} \left\{ \min_{m \in \{1,\ldots,M\}} \left\{ \min_\psi \{\kappa_i(j, m, \psi) + K(j)\} \right\} \right\}$$

$K_{source\ ID}$=constant.

where i≠Source ID, N(i) is a set of current neighbors of node i that in turn is a set of all nodes Ω in the network, j is a neighbor node belonging to N(i), m is a set of one or more channels in a set of M orthogonal channels in total, ψ is one or a multitude of physical layer parameters, $\kappa_i(j, m, \psi)$ is the cost from node j to node i, and the term K(j) is the accumulated cost from the source node to node j. The cost $\kappa_i(j, m, \psi)$ assumes a value for each channel and some physical link parameter(s). $K_{source\ ID}$ is the initial cost at the source node and it assumes a constant value that is typically set to zero. The set N(i) is a selectable set of the current neighbors of node i, and does not necessarily have to include all the neighbors.

The set m of channels may include one or more channels, depending on the requested bandwidth. For narrow-band connections, it may be sufficient with a single channel. For wide-band connections, several channels may be required.

Since it is commonly accepted to write node indices, such as i and j, as sub indices we will simply denote $\kappa_i(j, m, \psi)$ as $\kappa_{ji}(m, \psi)$ and $K(j)$ as $K_j$. With this notation, the CFPR algorithm, aimed at finding the least cost $K_i$ from the source node, may be summarized as follows:

$$K_i = \min_{j \in N(i)} \left\{ \min_{m \in \{1,\ldots,M\}} \left\{ \min_\psi \{ \kappa_{ji}(m, \psi) + K_j \} \right\} \right\}$$

$K_{Source\ ID}$=constant.

Each nesting level in the equation roughly represents a protocol layer. The innermost argument tune physical layer parameters, such as transmit power. Hence $\kappa_{ij}$ is typically a cost that depends on the value that the physical layer parameters ($\psi$) assume, but other non-physical layer factors could also be incorporated. Such factors could for instance be local load, or even remaining battery capacity. The next level of selection is a choice of the best set of channel(s) (m) for each individual neighbor. This represents the channel access or MAC level. The third level provides a choice among neighbors, hence choosing a path in the routing layer.

In general, the optimization may be completely centralized to a unique predefined unit, provided that the required information is either known or can be collected to the executing unit. However, it is also possible to distribute the algorithm to a plurality of network nodes, preferably all network nodes within the multihop network. In the distributed scenario, the detailed implementation depends on whether complete information or only local information is available. In the latter case, the algorithm may be executed in the relevant network nodes on a node-by-node basis, preferably using RREQ and RREP signaling for exchanging the required information, as will be described in more detail later on. On the other hand, if the required information is collated on the way to the destination node, the CFPR algorithm together with a corresponding admission control procedure may be executed entirely in the destination node based on the collated information.

The CFPR algorithm defined above is particularly suitable for distributed implementation, in which the optimization algorithm is distributed to a plurality of network nodes, and consecutively executed in the involved network nodes on a node-by-node basis. This generally means that a local search procedure is performed in each node i to evaluate the cost $\kappa_{ij}(m, \psi)$ from node j to node i for all nodes j in a selected set N(i) of neighbors, and the least cost $K_i$, to each node i from the source node is determined based on this evaluation together with information on $K_j$ received from each neighbor node j. The search procedure continues node by node until the entire tree of relevant nodes have been spanned.

Figure 5:
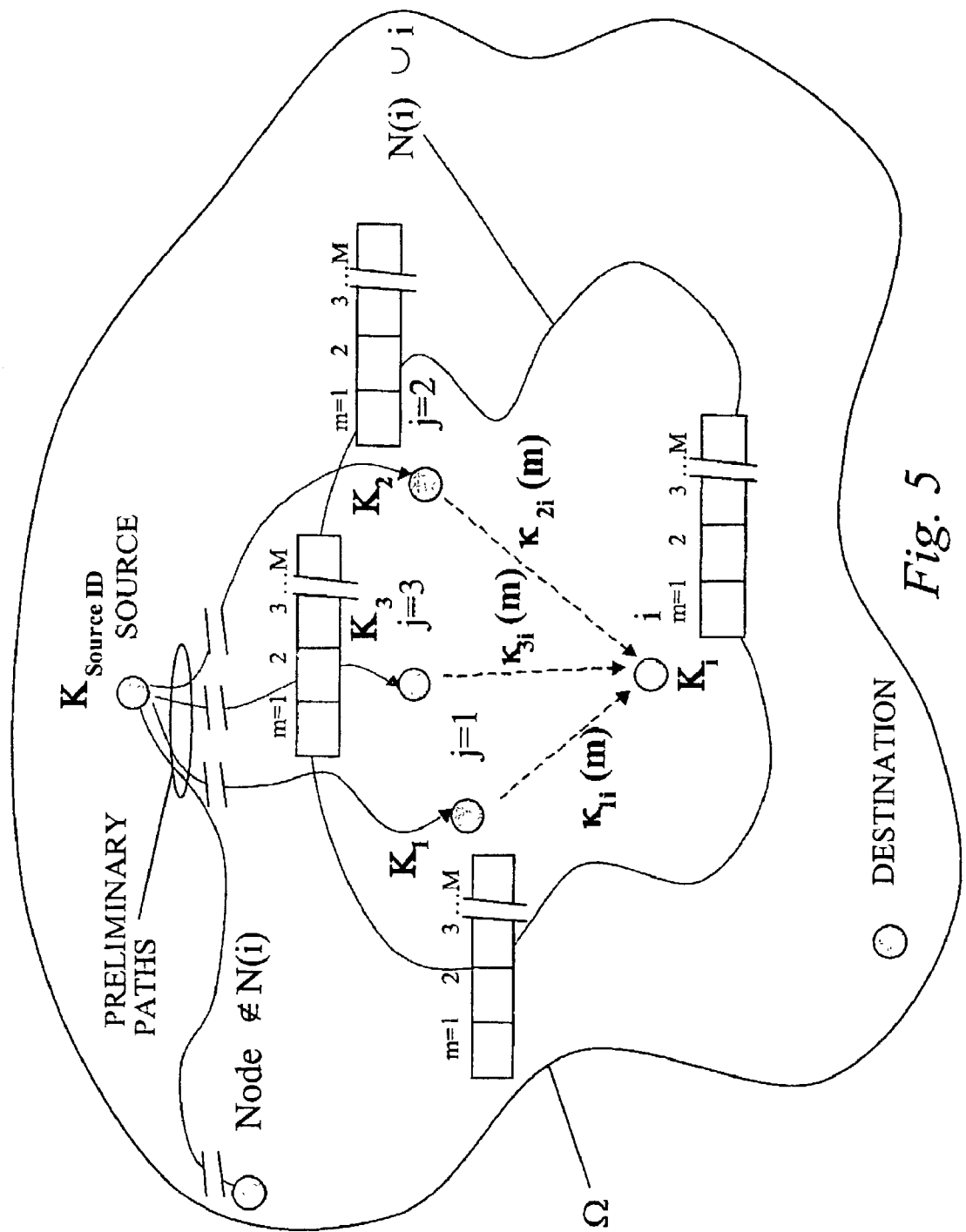
FIG. 5 illustrates the notation used for a preliminary connection path setup in an exemplary wireless multihop network.

Note that the CFPR algorithm shows some similarity to the Bellman Ford shortest path algorithm. However, there exist several differences. The CFPR algorithm is generalized to multiple dimensions (channels), it provides an integrated optimization of physical link parameters, channel and path, guarantees collision freedom and provides a close to shortest path. In low load situations, the path taken will normally be the actual shortest path. FIG. 5 tries to visualize some terminology and notation used in connection with the CFPR algorithm.

Now, when setting up a new path it is desirable to consider links of existing connections and avoid interfering with those. Likewise, it is also desirable to make sure that links of existing connections do not interfere with the links in the new connection. It is therefore useful to divide the nodes into four sets, with focus on only two nodes at this time, i.e. node i and j. The first two sets are simply the node that is considered to receive, i.e. node i and the node that is considered to transmit, i.e. node j. A third set is a set of neighbors of node j, N(j) but node i excluded. Nodes within this set are denoted u. The fourth set includes neighbors of node i, N(i) but node j excluded. Nodes within this set are denoted v. Typically, the neighbor sets have roughly the same set of nodes.

As indicated above, any suitable cost function may be used in the optimization, and the type of physical connection parameter(s) selected may vary depending on the detailed objective of the optimization. However, for a better understanding, an illustrative example of an optimization involving physical link parameters will now be described.

Example of Optimization Involving Physical Link Parameters Such As Transmit Power In accordance with a preferred example embodiment, collision freedom is ensured by selecting transmit power for node j such that sufficient receive margins $\gamma$ can be granted for involved nodes. For reception at node i, node j should use a transmit power $P_j(m)$ such that the resulting receive power $C_i(m)$ exceeds the level of interference, generated by nodes v (alternatively, the other nodes in $\Omega$ may also be used in the calculations) within the set $N(i)\backslash\{j\}$ and seen at node i, with a mitigation factor $\gamma_M$. Likewise, node j should use a transmit power $P_j(m)$ such that it is at least a receive factor $\gamma_R$ less than the receive power $C_u(m)$ at any of the nodes u within the set $N(j)\backslash\{i\}$. Here, the channel gain matrix G(m) is assumed known and with that it is possible to relate receive and transmit powers to each other. Moreover, the noise level W uses a factor $\gamma_W$ to ensure that one is generally interference limited rather than noise limited.

An additional and important condition that must be fulfilled is that node j shall not interfere with links along its own preliminary route towards the source node. R denotes the set of nodes along the preliminary route connected to node j and r indexes the nodes within R. Lastly, the receiver noise level is assumed to be W.

The maximum permitted and minimum required transmit power from node j can now be defined as:

$$\hat{P}_{\max j}(m) = \min\left\{ \min_{u \in N(j)\backslash\{i\}} \left\{ \frac{C_u(m)}{\gamma_m \cdot G_{ju}(m)} \right\}, \min_{r \in R} \left\{ \frac{\hat{C}_r(m)}{\gamma_m \cdot G_{jr}(m)} \right\} \right\}$$

$$\hat{P}_{\min j}(m) = \frac{1}{G_{ji}(m)} \cdot \left( \gamma_W \cdot W + \gamma_R \cdot \left( \sum_{v \in N(i)\backslash\{j\}} P_v(m) \cdot G_{vi}(m) + \sum_{r \in R} \hat{P}_r(m) \cdot G_{ri}(m) \right) \right),$$

where, $\hat{P}_r(m)$ and $\hat{C}_r(m)$ indicates estimated (or rather preliminary) transmit and receive power respectively for a node within set R. $P_v(m)$ and $C_u(m)$ on the other hand indicates transmit and receive power respectively for nodes with established traffic. Later, when the algorithm has converged, the preliminary path connecting source and destination will be selected and established as an active path until its validity expires. All transmit powers as well as receive power levels will be updated to reflect the newly established connection.

Note here that the formulation of $\hat{P}_{max_j}(m)$ is such that it does not guarantee that the resulting CIR at an existing links-receiving node is not deteriorated below a certain CIR level. Instead it represents a simplification wherein it is unlikely that the CIR will degrade significantly below $\gamma_R$, provided the mitigation margin $\gamma_M$>receive margin $\gamma_R$. The situation when $\hat{P}_{max_j}(m)$ is selected such that CIR is guaranteed not to degrade lower than a desired CIR level will be described later on.

As some channels are not used for transmitting nor receiving, the formulation of the algorithm requires that the transmit power is set to 0 and the receive power to ∞. In practice, one does not need to consider such channels when performing the cost computations and consequently can skip the same.

A reasonable cost metric for $\kappa_{ji}$, is the link transmit power. Such metric opts to minimize the cumulative transmit power used over an entire path. This is good for battery consumption reduction, but it also reduces the interference level in the system leaving space to incorporate new connections. Thus the system may operate at a higher network load. The metric is selected as:

$$\kappa_{ji}(m) = \begin{cases} \hat{P}_{min_j}(m) + C(\hat{P}_{max_j}(m) - \hat{P}_{min_j}(m)) & , \text{if } \hat{P}_{min_j}(m) \leq \hat{P}_{max_j}(m) \\ \infty & , \text{if } \hat{P}_{min_j}(m) > \hat{P}_{max_j}(m) \end{cases}$$

where C is a constant selected in the interval between 0 and 1. This means that $\kappa_{ji}$ is restricted by $\hat{P}_{min_j}(m)$ and $\hat{P}_{max_j}(m)$. For C=0, $\kappa_{ji}$ is equal to $\hat{P}_{min_j}(m)$. For C=1, $\kappa_{ji}$ is equal to $\hat{P}_{max_j}(m)$. The reason for setting the cost to ∞ is that the cost $\kappa_{ji}(m)$ shall only assume a useful value when it is feasible.

For correct and fast convergence, whenever $K_i=\infty$, node i shall discard the preliminary path leading from the source and set relevant transmit power to 0 and relevant receive power to ∞. Any node having node i in their preliminary path shall repeat the procedure.

Figure 6:
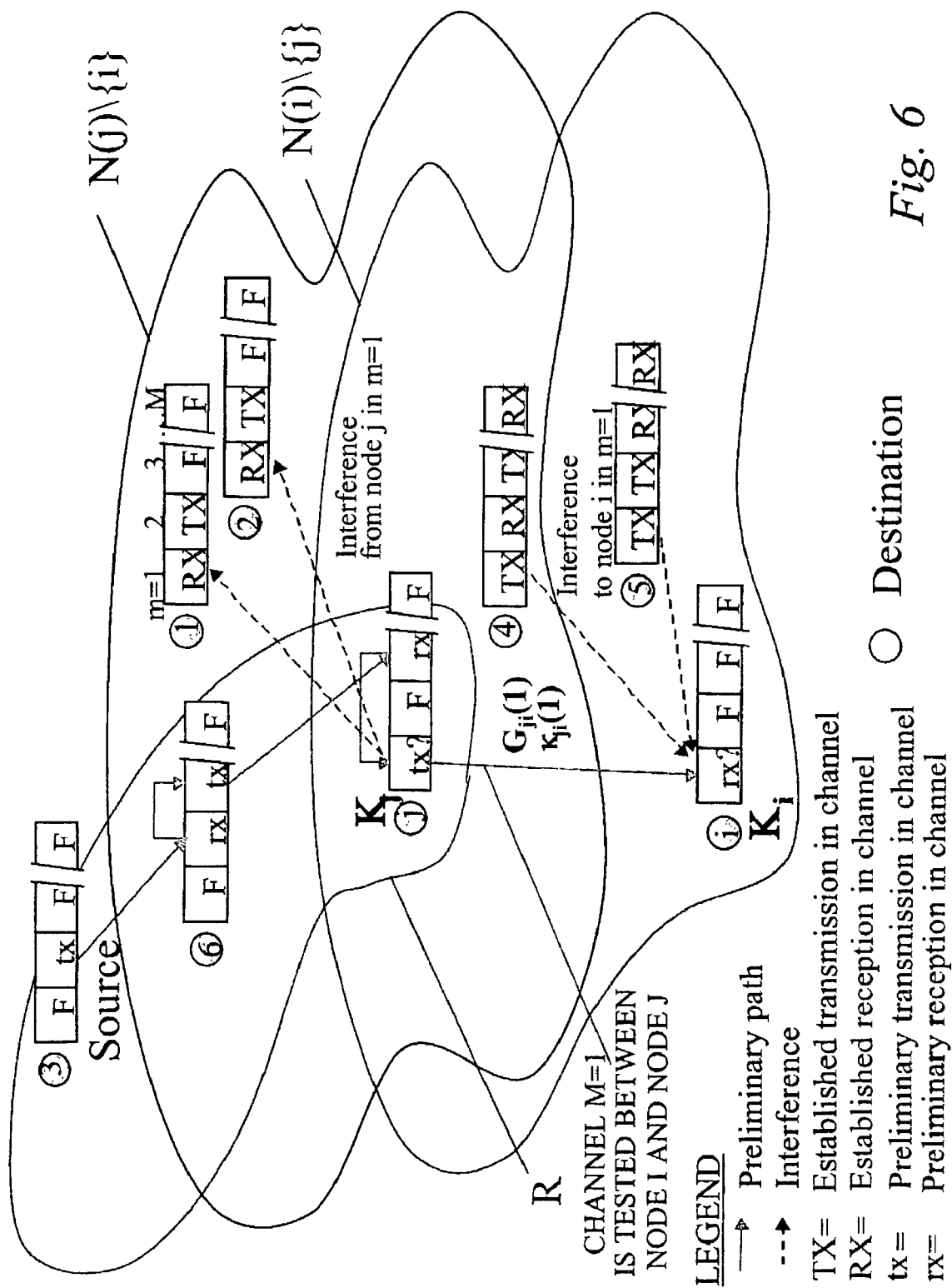
FIG. 6 illustrates a preliminary connection path setup in an exemplary wireless multihop network for a specific node pair and channel.

FIG. 6 shows a preliminary path departing from node 3 (the source node) in ch 2 → node 6, channel switch ch 2 → ch 3, node 6 in ch 3 → node j. The situation shown reflects the testing of whether node i and node j can communicate in ch 1. This necessitate a channel switch ch 3 → ch 1 in node j as well as ensuring that node j does not interfere e.g. with node 1 and 2 in ch 1. Similarly, it is ensured that node j can send with sufficient power to reach node i under interference from node 4 and 5 in ch 1.

The above procedure runs until paths and channels does not change. Then, when the new connection is established, data may start flowing. After some time when there is no need for the connection, it is removed. Low mobility may be supported provided the lifetimes of the connections are relatively small in relation to node mobility and/or channel variations.

The algorithm works even when no dynamic power adjustment is possible. In this case, the physical link adaptation is a selection between transmitting with a fixed link transmit power $P_{fix}$ (ON) and not transmitting at all (OFF). Preferably the link transmit power is selected to be $P_{fix}$ as long as $P_{fix}$ is in the interval between $\hat{P}_{min_j}(m)$ and $\hat{P}_{max_j}(m)$, otherwise the link transmit power is set to zero.

In order to assist the reader in understanding the basic concepts of the technology as well as the CFPR algorithm, an example of CFPR algorithm operation will now be described with reference to FIGS. 7-13, which depict a network having 36 nodes distributed over a square area and using 14 time slots (TS). Each node is depicted as an unfilled circle. The Source node is indicated by a black star within the circle whereas the destination node is indicated by a gray star. Each node has an ID that is written just to the right of the node. Connections between nodes are shown with links in different gray-scales, where the gray-scale represents the TS number. The TS number is also depicted within brackets together with the link, halfway between the nodes the link interconnects.

Figure 7:
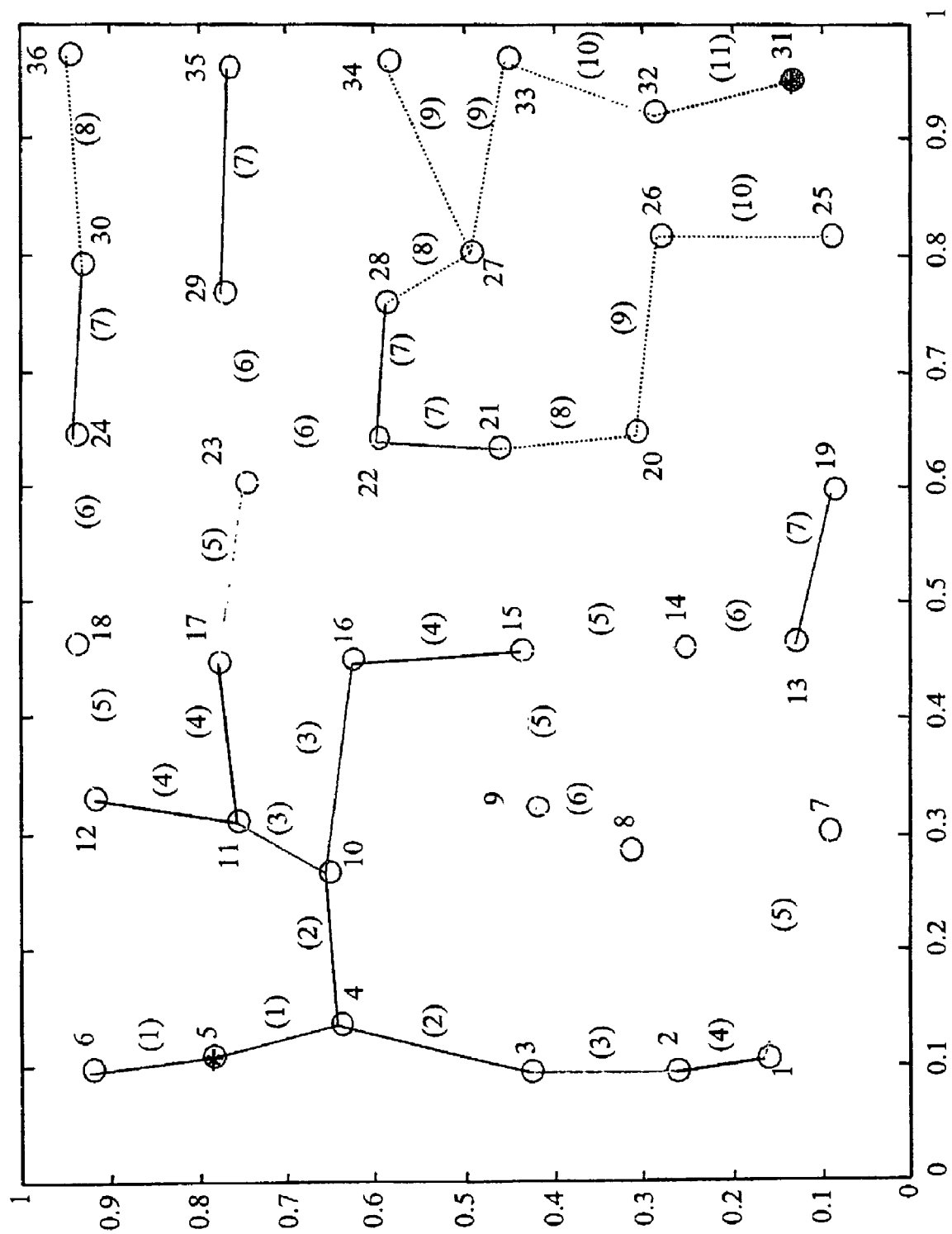
FIGS. 7-12 are schematic diagrams illustrating an example of the operation of an inventive unified mechanism for QoS provisioning in a given network.

FIG. 7 shows a tree rooted at source with ID 5. This represents the phase of connection set-up of a first flow when the CFPR algorithm has generated preliminary connections consisting of paths, channels and adapted link parameters. In this particular implementation of the CFPR algorithm, the lowest TS number is always chosen if there exist equally good time slots. This is why slot numbers are assigned in number order from the source node.

Figure 8:
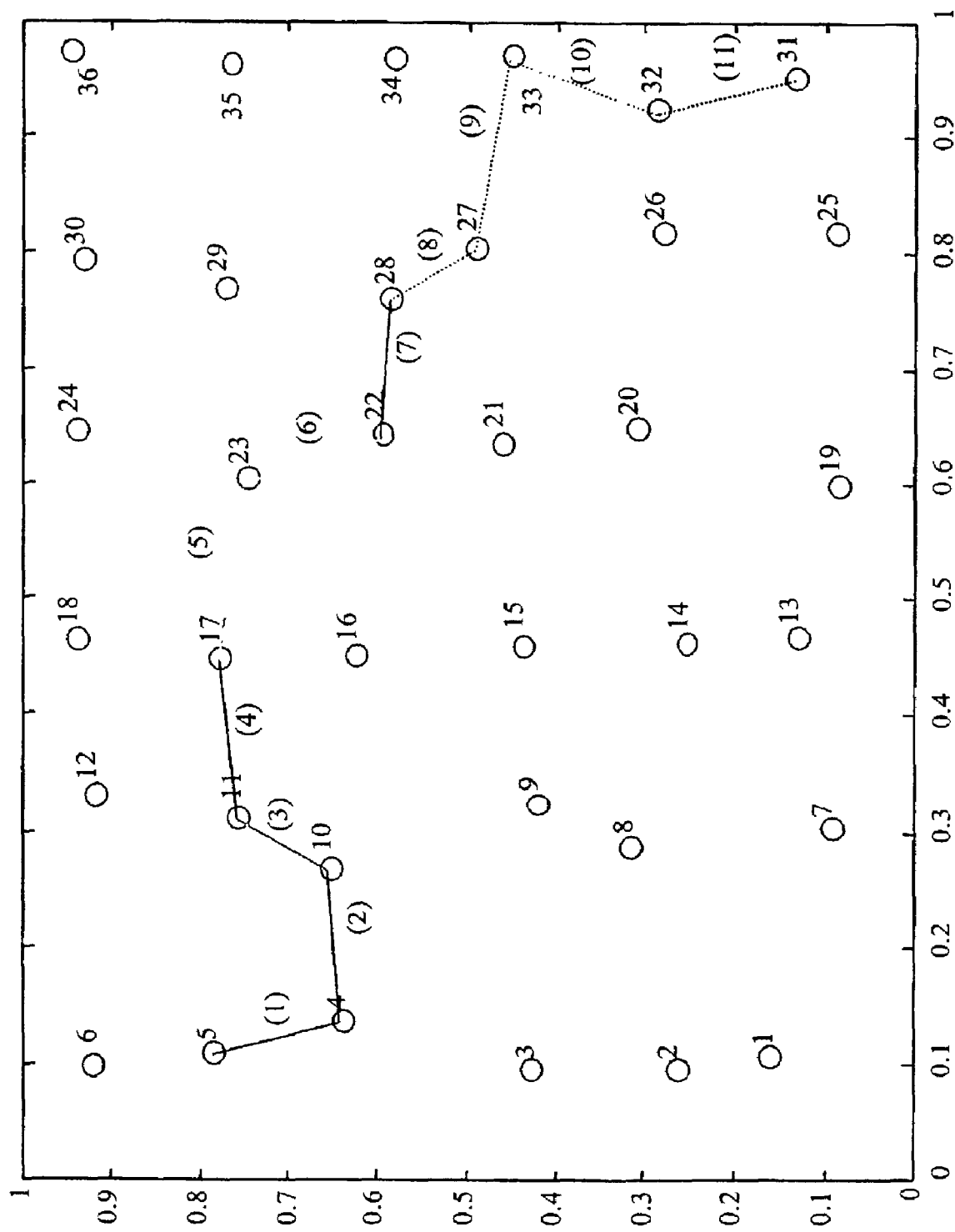

FIG. 8 shows the selected path to destination node with ID 31. Hence, all other preliminary paths have been discarded except the CFPR optimal one between the source destination pair.

Figure 9:
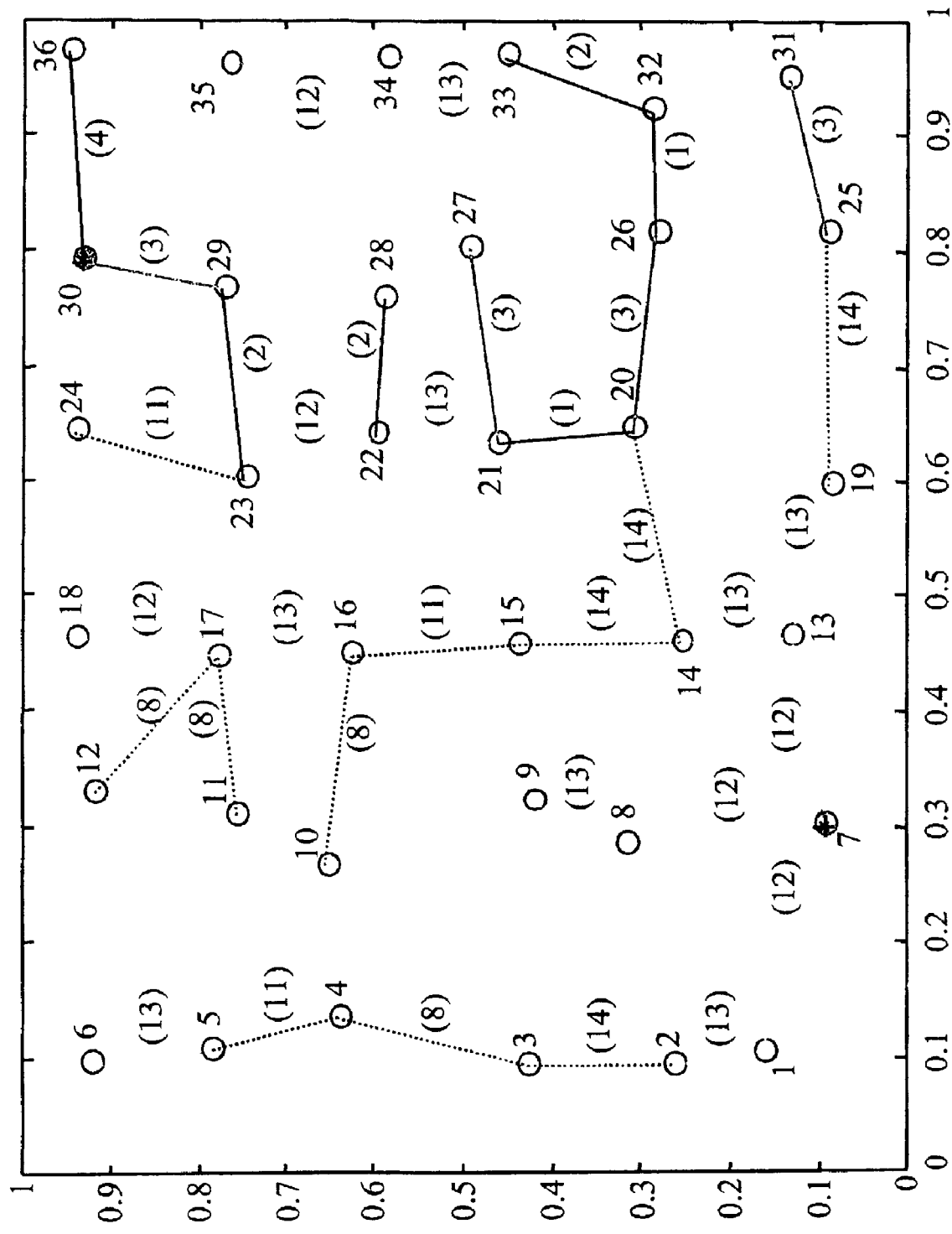

When a second flow and connection is to be established, one can intuitively see that links are selected such that they are not harmfully interfering with the existing connection and the other way around. In FIG. 9, node ID 7 is the source and node ID 30 is the destination.

Figure 10:
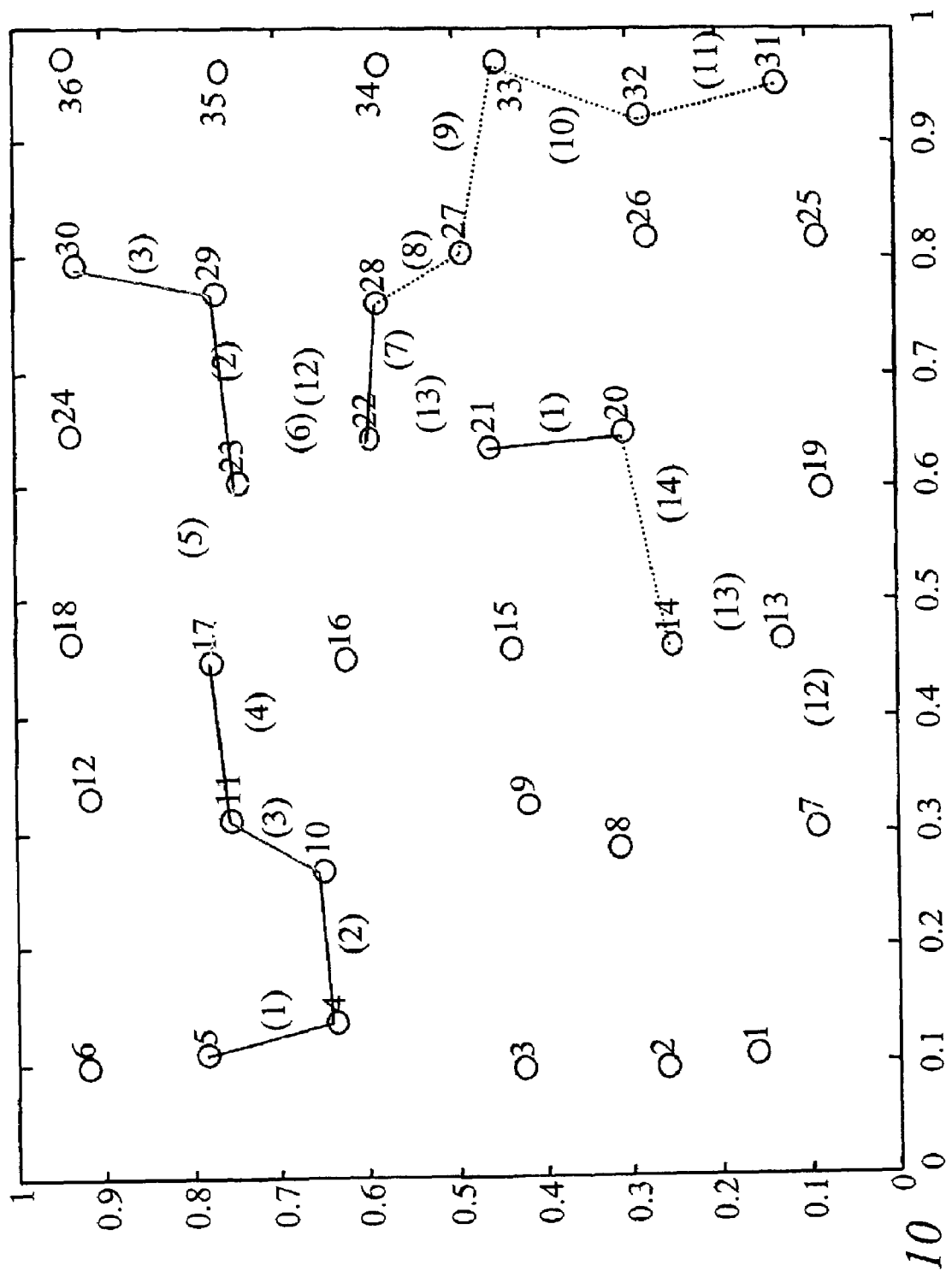

When the second connection has been established, it is noticed that TS 1, 13, 12, 2 and 3 have been reused. Moreover, two slots are used concurrently between node 22 and 23. FIG. 10 illustrates the resulting paths and channels for the first and second flow.

Figure 11:
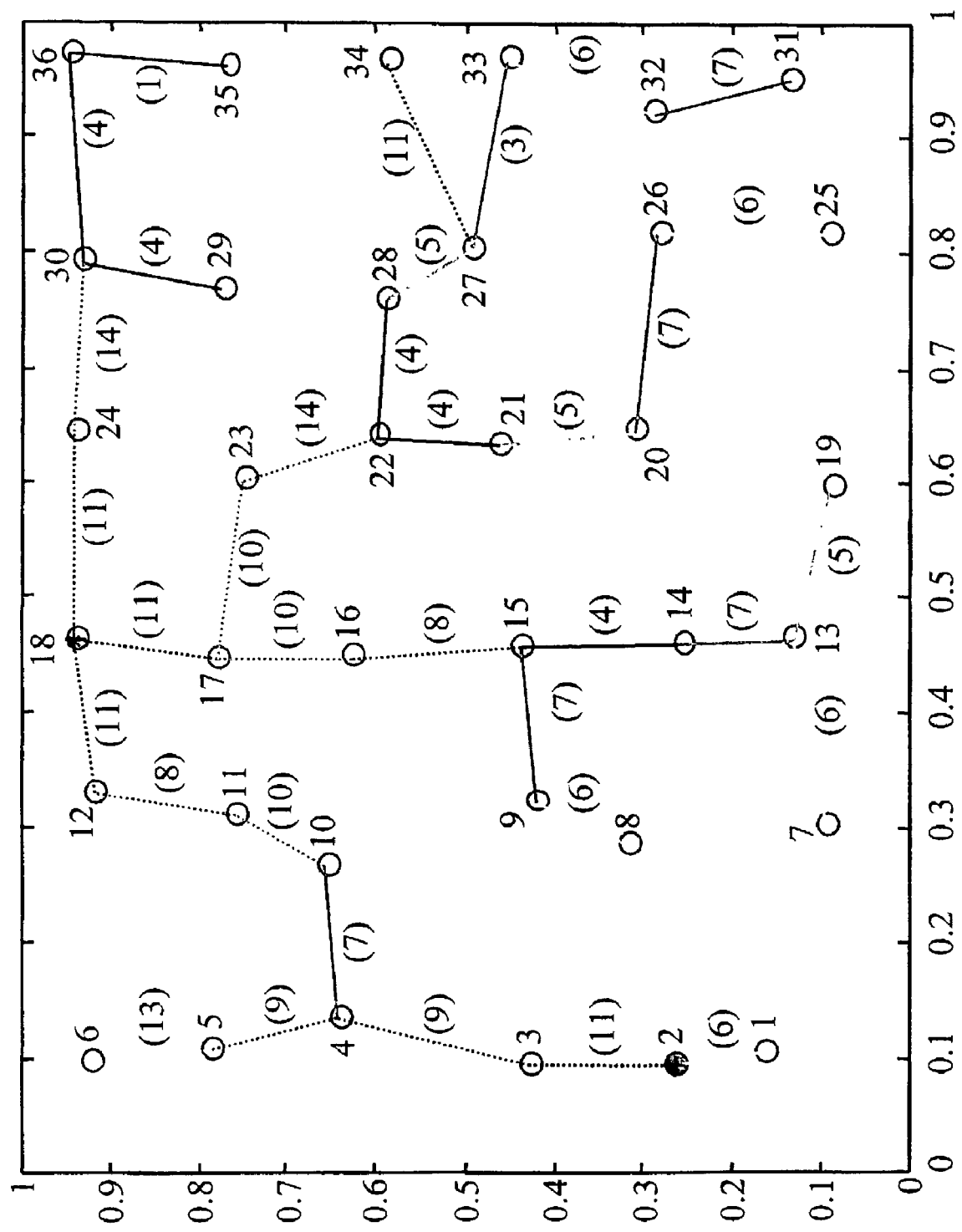
Figure 12:
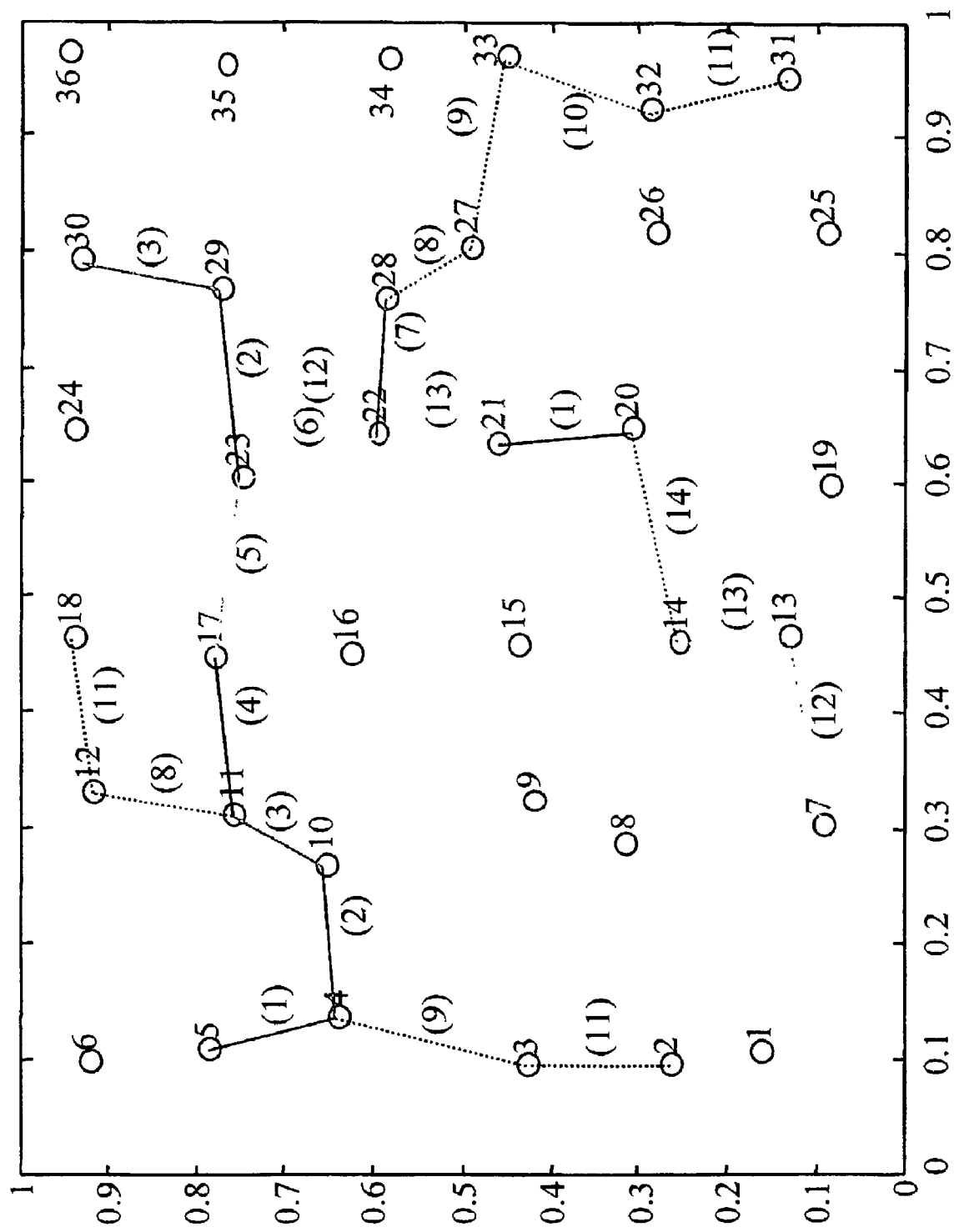

Finally, the establishment of a third flow and associated connection is depicted in FIGS. 11 and 12.

It should be noted that FIGS. 7-12 only show the establishment, but not the release of connections. However, the latter is trivial and is therefore left out.

Figure 13:
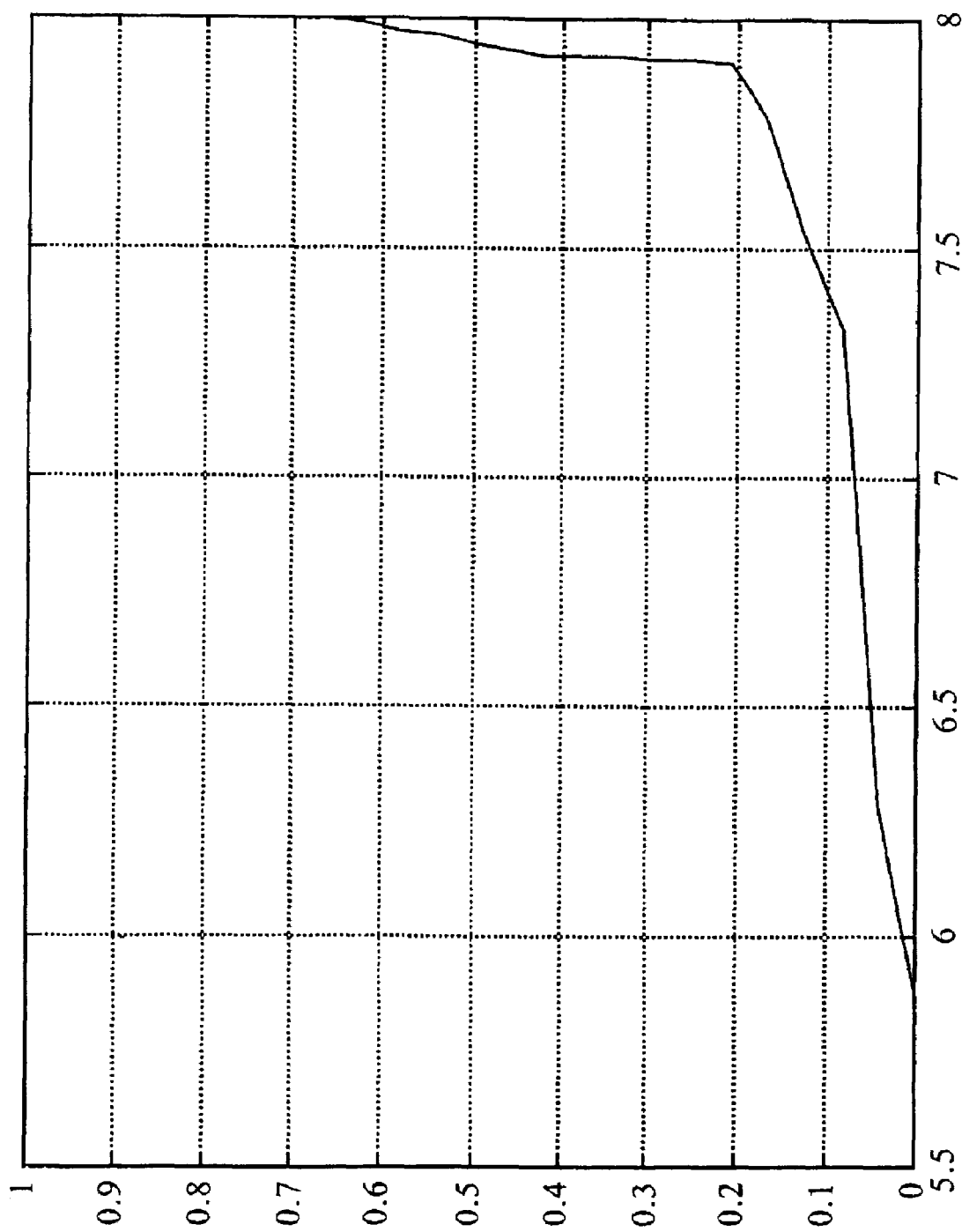
FIG. 13 is a schematic diagram illustrating a graph of the resulting CIR CDF for all active receivers corresponding to the example of FIG. 12.

In the above example, $\gamma_M$=8 dB, $\gamma_R$=5 dB and $\gamma_W$=8 dB. The resulting CIR CDF for all active receivers is shown in FIG. 13.

Although the collision-free resources or tunnels from source to destination naturally makes one think of circuit-switched connections, it should be understood that also virtual circuits may exploit these collision-free resources. In this case, the capacity over a link is generally shared between multiple connections. This normally requires the use of a scheduler in each node so as to give each connection its negotiated capacity.

Additional/Optional Issues

Comments on Channel Behavior and Margins

In the case of line of sight (LOS), as may often be the case in a rooftop network, the channel will be relatively stable. Therefore, the various margins $\gamma$ can be relatively small. However, when channel strength fluctuates on a time scale larger than the packet duration or interleaving depth, the margins $\gamma$ should be selected with sufficient margin to ensure that interference to existing or own connection will not cause major problems.

Cost Directionality

Note that it is allowed to permute the order of index i and j of $\kappa_{ij}$ in the given equation, such that the cost from node i to node j is considered instead of the other way around. Hence, the cost from the source node is not determined, but rather the cost towards the source node. In this case, the source node may more appropriately be appointed as the destination node.

As the preferred algorithm is heuristic, it will not always provide a path with the least attainable cost metric. One way to handle this is to determine the path twice—one time with the source as the root and a second time with the destination as the root. One then needs to use a metric that considers that the flow is directed from the source towards the destination:

$$K_{Destination} = \min\{K_{Destination}^{from\ source}, K_{Source}^{to\ destination}\}$$

Complexity

To reduce the complexity, a number of measures can be adopted. First a reasonable amount of neighbors N(i) should be selected to ensure reasonable degree of network connectivity. A value of 6-10 neighbors should be sufficient. The search region of a suitable path for the connection may be limited. One way to accomplish this is to search some distance or hops around the shortest path between the source and destination nodes. This necessitates a shortest path to be established prior the search and those nodes in the vicinity of the path are informed to belong to the search region. Note that other choices of search regions are also possible. One sensible restriction on search region includes consideration of those neighbors that are closer towards the source. One way to determine that nodes are closer to the source is to run an ordinary shortest path algorithm as a first step before the CFPR algorithm is applied. If the CFPR algorithm uses transmit power as metric, it makes sense to use a similar metric such as the accumulated path loss from the source. As indicated earlier, many terms can be discarded in the computations above when they assume values like 0 or ∞.

Creation of Sensible Routes

Not all routes that are generated by a heuristic algorithm need to look sensible. For example, channel starvation at high loads may result in a path that goes in a large zigzag line. There are at least three mechanisms that handle this in part, if this would be considered as a major problem. First, by exploiting load control, channel depletion will be less likely to occur. This in turn provides routes that are closer to a shortest path, provided the same metric is used as in the CFPR algorithm. A second method is provided by limiting the scope of route search as described under the complexity section above. One way to achieve this is by using neighbors with less Bellman-Ford cost towards the source.

CIR-limit-based Max Permitted Transmit Power

Rather than limiting the transmit power to a margin γ less than received power for any receiver part of an existing link, an alternative condition is to limit transmit power so that CIR for any receiver part of an existing link is not less than a CIR threshold $\Gamma_M$. The maximum allowed transmit power is:

$$\hat{P}_{\max_j}(m) = \min \left\{ \begin{array}{l} \min_{u \in N(j) \setminus \{i\}} \left\{ \dfrac{C_u(m) - \Gamma_M \cdot (I_u(m) + \hat{I}_u(m) + W)}{\Gamma_M \cdot G_{ju}(m)} \right\}, \\ \min_{r \in R} \left\{ \dfrac{\hat{C}_r(m) - \Gamma_M \cdot (I_r(m) + \hat{I}_r(m) + W)}{\Gamma_M \cdot G_{jr}(m)} \right\} \end{array} \right\}$$

where each receiver part of an existing link or preliminary path experiences the interference level I(m) and $\hat{I}_x(m)$ is the expected interference at node x from nodes along the preliminary path. This puts a lower bound on experienced CIR level. The result is that traffic will be rejected rather than allowing existing links CIR level to fall below the CIR threshold $\Gamma_M$.

CIR Balancing

When the transmit power levels have been determined during optimization, it may happen that, in practice, the actual CIR levels anyway deviate from the desired CIR levels. This may be compensated for by performing a conventional CIR balancing, either distributed or centralized, of the transmit power levels in the network. In other words, once a new connection has been setup, it is possible to balance the transmit levels so as to obtain the desired CIR levels (or other QoS measure) in the network.

Alternatively, in particular for the centralized case, CIR balancing is used as an extra step of the CAC phase. In case the CIR balancing fails, the connection is rejected. Note that the CIR CDF in FIG. 13 will then be a step function. The advantage of this particular approach is an overall improved performance.

Algorithm Extended to a Greater Horizon

As it is possible that the basic operation of CFPR determines a channel that is unsuitable so to say further down the road, an extension to the basic CFPR algorithm is described here. As an example, assume that channel 1+2, 1+2, 1 are free for node k, j and i respectively, k and i are not neighbors while j is neighbor to both k and i. If node j would select to use channel 1 from node k because it has lower cost than channel 2, that would result in that node j and i can't create a link. Obviously, it would have been smarter to assign channel 2 between k and j, but using channel 1 from j to i.

The way this is handled here is to let node i determine the link properties (e.g. channel and link parameters) from k to j, constrained that a link from j to i can be created. Hence, node i searches for the lowest cost combination for two links at the same time. However, even though two compatible links have been determined, only the link closest to the source is kept. In successive step, another node may decide to use the link between node j to i when it searches for the most promising link combination, but it discards the link from i to itself. The exception to this rule of neglecting the link, furthermost away from the source node is for the destination station, which determines the two last links but does not discard any of the two links.

In the basic CFPR algorithm, only one link is considered at a time. In this version of the CFPR algorithm, one rather takes into account two consecutive links at a time. The concept of horizon is introduced here to indicate how far away the algorithm operates. The basic CFPR has horizon=1, whereas the CFPR version in this section has horizon=2. The horizon can be extended to any larger value, however with potentially a tremendous increase in complexity when many nodes and channels are involved.

Higher Data Rate Support

Since different applications may have different requirements on data rate, it is important to provide some support for different data rates. Two methods may be utilized for varying the end-to-end throughput. In the first method, the margins $\gamma_R$ together with $\gamma_M$ and $\gamma_W$ are selected to support a link mode comprised of a code rate and a signal constellation. Simplified, different rates may be handled by specifying different CIR requirements (requesting a CIR that corresponds to a certain data rate). Typically the signal constellation may vary from 2-BPSK to 64-QAM. This is preferably also considered in the conditional setting of transmit power for $P_{min}$ and $P_{max}$. In the second method, multiple paths are established and used jointly to provide desired data rate. Combinations of the two methods may also be used.

Application Layer Integration

As previously mentioned, it is possible to use other protocol layers as well as more than three protocol layers in the optimization. For example, the application layer may be included in the optimization, preferably in combination with the three lowest protocol layers. For instance, the application layer may house an adaptive application, able to operate under different data rates but with an application quality associated and compatible with the used data rate. Many video and voice based applications are good examples of adaptive applications that enable multiple data rates. More particularly, when a new connection set-up is attempted, the optimisation of the objective function (or the algorithm) is performed with respect to multiple data rate requirements (given by the application layer). Various data rates can, as indicated previously, for example be supported by using a combination of multiple channels (e.g. multiple timeslots) between nodes, through link adaptation (various combination of signal constellation and forward error coding rates) or a combination of both. In the integrated optimization of said four layer functions, the feasibility of a range of allowable rates is evaluated under given constraints. In an exemplary example embodiment, at each optimisation step, any desired but unfeasible high data rate is removed from further optimisation steps.

The application layer may alternatively be used in an integrated optimization together with only two of the three lowest protocol layers.

Algorithm Extended to Adaptive Antennas and MIMO

The algorithm can be extended to incorporate both adaptive antenna and MIMO communication. For the adaptive antenna case, the physical layer parameters, such as antennas weights on receive and transmit antennas are selected while minimizing transmit power. This is constrained to not disturb ongoing traffic and ensure that the desired receiver has sufficient quality (signal to interference and noise ratio).

When sufficiently many antennas (in the adaptive antenna array) are deployed and high directivity can be achieved, interference will cease to be the limiting factor for the network. Instead, it is the channel resources that will limit the load that can be carried by the network. In the extreme case, i.e. interference can be neglected entirely, another optimization criteria is adopted, trying to minimize the number of hops. Constraints to balance the free resources at each node may also be added, to increase the likelihood to find a free path at each instance.

MIMO operates in a similar manner by selecting link parameters including transmitter and receiver MIMO weights. The parameter selection is constrained of minimizing the link transmit power while also meeting a desired MIMO-link throughput.

Implementational Aspects

In general, the optimization algorithm along with the corresponding connection admission control (CAC) procedure may be implemented as hardware, software, firmware or any suitable combination thereof, using for example microprocessor technology, digital signal processing or ASIC (Application Specific Integrated Circuit) technology. For example, the algorithm may be implemented as software for execution by a computer system. The software may be written in almost any type of computer language, such as C, C++, Java or even specialized proprietary languages. In effect, in a software-based implementation, the algorithm is mapped into a software program, which when executed by the computer system determines connections and handles admission control. Preferably, however, the CFPR algorithm and the corresponding CAC procedure are implemented more or less in hardware, using ASIC or other sub-micron circuit technology.

Figure 14:
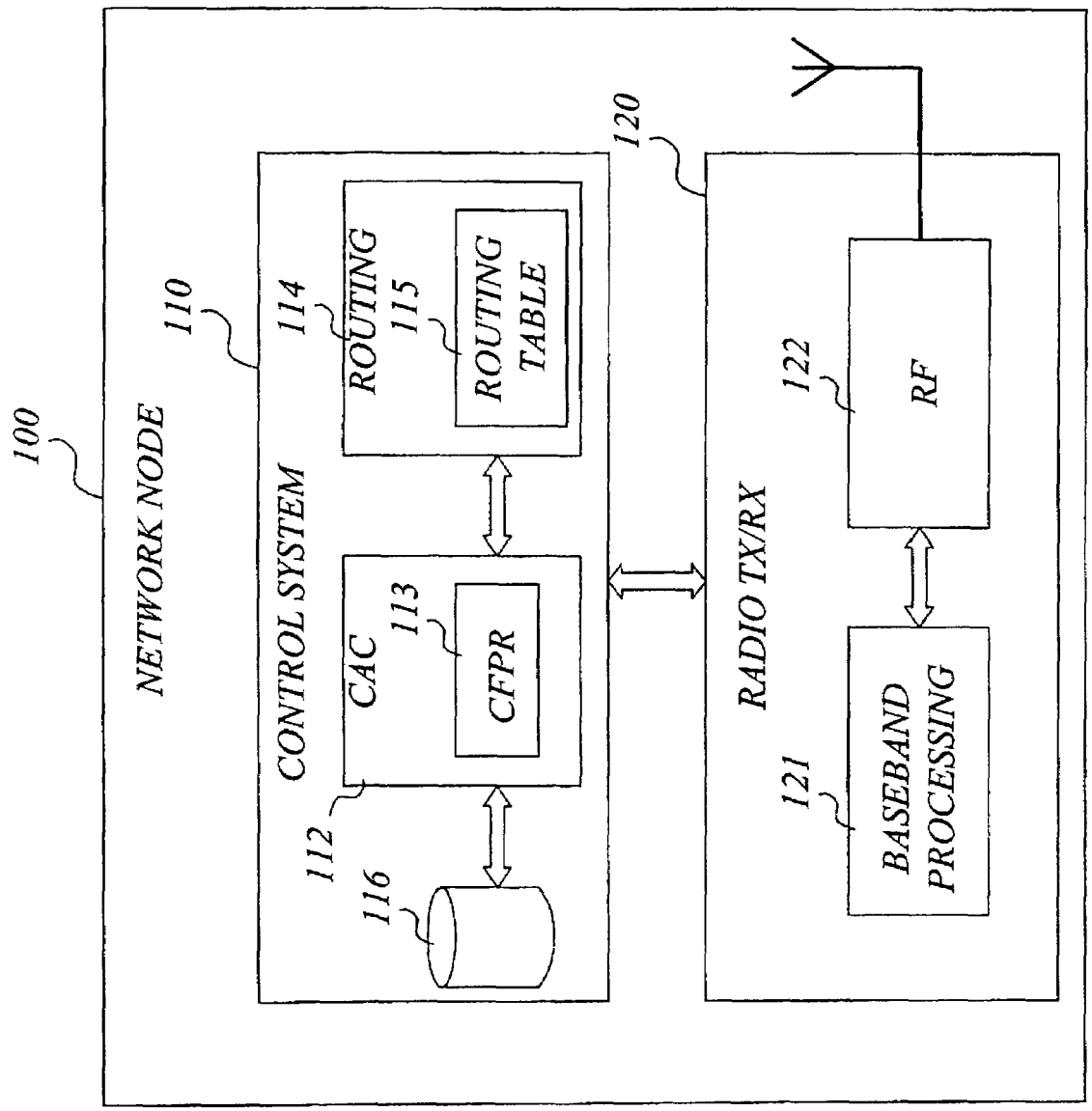
FIG. 14 is a schematic diagram of a network node into which an example CFPR algorithm is implemented.

FIG. 14 is a schematic diagram of a network node into which a CFPR algorithm is implemented. Only those network node components that are relevant to the technology are illustrated in FIG. 14. The network node 100 comprises a control system 110 and a general radio transmission/reception unit 120 having a baseband processing module 121 as well as a radio frequency (RF) module 122. The control system 110 preferably comprises a connection admission control (CAC) unit 112 and a routing unit 114, as well as a database 116 for holding network information. The routing unit 114 includes functionality for routing traffic by means of a routing table 115. In this particular embodiment, a CFPR unit 113 is implemented in the CAC unit 112 for determining a set of connection parameters, if possible. The CFPR unit 113 retrieves the relevant information on existing connections as well as the preliminary connection's own chain of links from the database 116 and/or directly from inter-node control signaling, and executes a CFPR algorithm with a suitable objective function. The CAC unit 112 is configured for making a CAC decision based on the execution results of the CFPR algorithm. If no feasible set of connection parameters can be determined by the CFPR unit 113 in view of the given QoS requirements, the GAG unit 112 rejects the connection setup request. On the other hand, if the CFPR algorithm produces a set of feasible connection parameters, the requested connection is established. This is normally accomplished by updating the routing table 115 in the routing unit 116 with the new connection parameters, and forwarding the connection parameters to the involved network nodes using 'flooding', spanning-tree forwarding, source routing or any other conventional mechanism. This primarily concerns a centralized implementation. In the following, however, implementational aspects concerning a distributed implementation will be discussed.

On Demand Implementation of CFPR

CFPR can be implemented in a distributed manner. This may be done by utilizing the concept of on demand routing, as previously mentioned. Although on demand routing is known from some of the state-of-the-art schemes, there are several amendments to the traditional on-demand routing approach.

The first issue is that each (Resource Request) RREQ in the network brings not just a list of nodes along a preliminary route, but also specific details on resource allocations. For example, each receive slot for a preliminary connection could be associated with a receive power level. In case CIR-limit-based maximum permitted transmit power is used, the noise and interference level may also be included.

The reason to convey this information is to ensure that slot and transmit power allocations does not interfere with resources allocated along a preliminary connection. Accordingly, the transmit power levels of resources in a preliminary connection is also distributed with the RREQ. The reason for this is that a node i should be able to determine if any node along the preliminary connection will interfere when node i is receiving.

The list of the preliminary connection (node IDs) and associated information such as used channels, potentially used transmit power, potentially experienced receive power (and experienced interference) may be limited to some fixed length. The list then act in a FIFO manner when the list is full. The rational for this is that one doesn't want to waste resources sending useless information. Obviously, a node in the preliminary list will be of low importance when it is sufficiently far away from node i, and is not harmed by interference from node i or interfering node i.

A field for cost metric, that is not simply a hop metric, is also conveyed in the RREQ. One particular metric discussed earlier was based on transmit power, giving the accumulated transmit power level along a route.

When the destination node receives the RREQ, it selects a least cost path according to the distributed execution of the CFPR algorithm and replies with a RREP that is relayed along the selected path backwards to the source node. The RREP is preferably sent with sufficient high power on a channel that is essentially collision free in a larger area such that adjacent nodes overhear the RREP information. Nodes overhearing the RREP information subsequently update their resource allocation databases. The protocol details for the RREQ and RREP are known from the prior art and therefore not further discussed.

Each control message such as RREQ and RREP also incorporate the used transmit power, such that the receiving node can determine the path loss. This is feasible, when the channel is more or less reciprocal in average path gain sense. In the non-reciprocal case, other well-known methods to estimate path gain may be exploited.

The complexity reduction schemes described above may be used in conjunction with the on-demand route determination.

Finally, the RREQ may depending on bandwidth requirement indicate the desired margins $\gamma_R$ together with $\gamma_M$ and $\gamma_W$ as well, or the desired link mode or both. Similarly, RREP announces relevant connection parameters such as transmit power, received power, desired margins, relevant time slots (channels) and so forth.

Complexity Reduction of the On-demand Operation

The building of a complete tree structure with multiple preliminary paths, incurs unnecessary processing as ultimately, merely one path will be used. This section suggests another version of the on-demand operation suited to mitigate unnecessary processing of redundant paths.

Assume that the source node has a rough idea on where the destination node can be found. This could for instance be given by a proactive shortest path protocol such as DSDV that is updated on a slow basis, being known a priori (i.e. fixed nodes) or even on-demand. A RREQ can now be sent towards the destination along the shortest path or along a region following the shortest path. In doing so, the RREQ gather link information of existing connections along the shortest path. This information contain the same information required for the CFPR algorithm to compute a connection later on, such as used channels, used transmit power, experienced receive power and so on. When the destination node receives the RREQ, it processes the information gathered by RREQ through the CFPR algorithm and its derivatives. Note that the RREQ can contain a request for a bandwidth that can not be supported by a single connection. In that event, the destination node may determine multiple connections for a flow. Subsequently, one (or more) RREPs are sent back to reserve the resources. The RREP will then contain node ID's, channel to be used and link parameters (e.g. transmit power).

The advantage with this approach is that computation is only performed at the destination node and the flooding of the RREQs is limited. As no computation is performed during the forwarding of the RREQs, the RREQs will be sent fast through the network. Another advantage is that the destination node can ensure loop freedom, run the CFPR algorithm both forward and backwards (as indicated in connection with cost directionality), and implement arbitrary (vendor specific) algorithms.

A disadvantage is that the information contained in the RREQs can become very large for very long routes. One way to solve this problem is to incorporate intermediate termination points between source and destination, e.g. every 20:th node or so.

Of course, also the previously described tree-based approach may be used over a limited region with a limited set of nodes.

Algorithm Extended to Non-slotted Channel Access

The CFPR algorithm can be extended to incorporate channel access techniques that is not dependent on dividing the medium in equal sized channels with predictable channel boundaries. Examples of such a channel access scheme is the 802.11 DCF protocol. Note that current operation of DCF does not allow allocating resources repetitively in the future.

Figure 15:
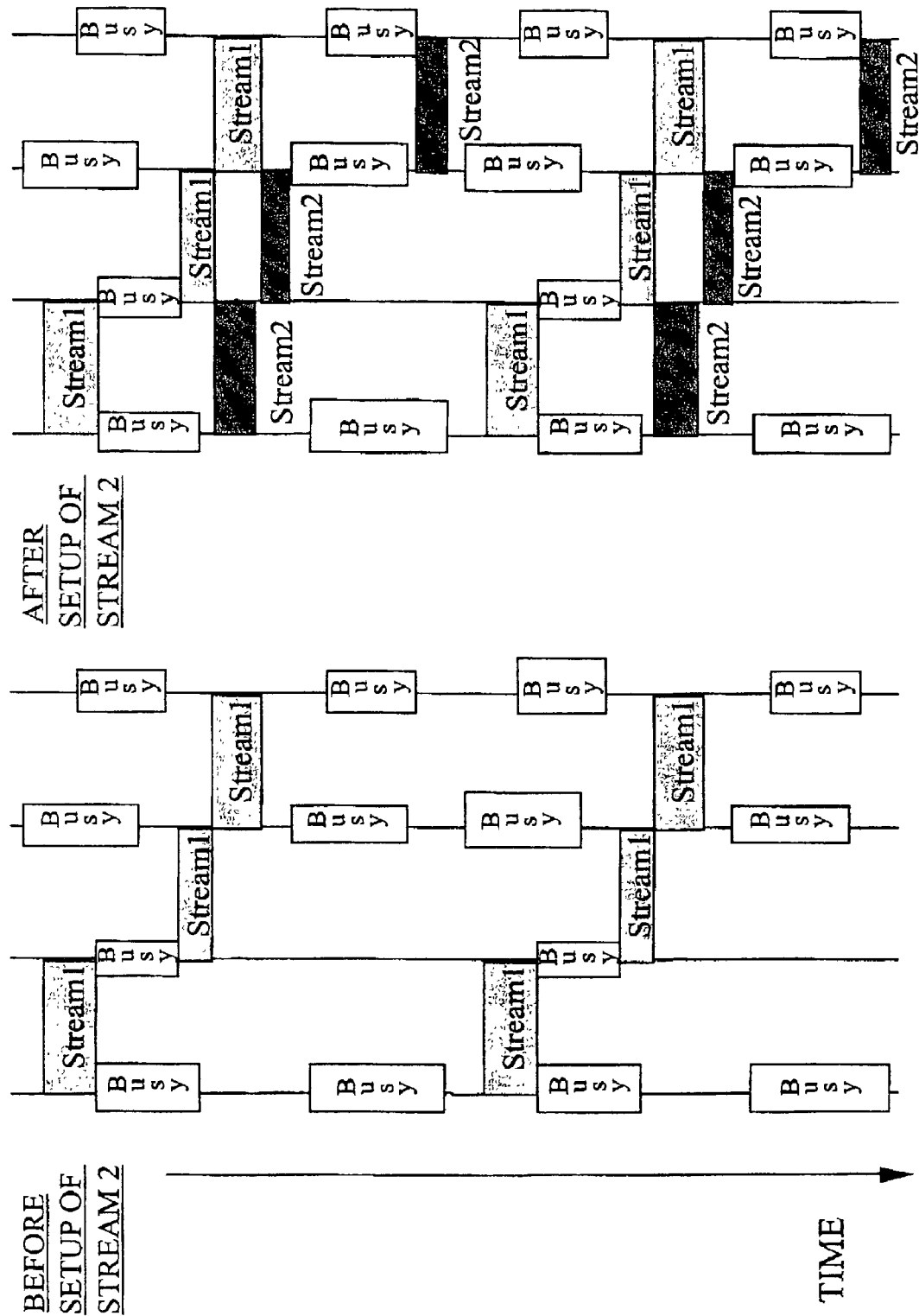
FIG. 15 is a schematic diagram illustrating an example of non-slotted channel reservation.

In this case, the cost $\kappa_{ij}$ may involve delay, possibly in combination with transmit power. Each node tries to find a transmit window between or after ongoing transmissions for a packet of predetermined size. The link rate may be adapted in order to compress data packet transmissions in time. Given that maximum link rate is used whenever possible, the transmit power may be adapted (minimized) while ensuring that reception is a factor $\gamma$ above interference plus noise. FIG. 15 illustrates how various link rates are used on different links. This results in a different duration to send packets, the so-called transmission duration delay. Effectively, route, medium access delay and link layer parameters (such as link rate and/or transmit power) are determined such that substantially non-interfering communication with respect to existing connections as well as the preliminary connection's own chain of links is ensured.

By properly selecting transmission instance delay, and link rate (affecting the transport delay) for each node, it is thus possible to minimize the overall end-to-end transport delay from source to destination. Once the fastest link mode is used, the link transmit power may be reduced as much as possible, while still fulfilling the CIR requirement for the link mode. This actually means that both delay and transmit power may be combined in the objective function, preferably in a weighted manner. If it is more important to minimize delay (or transmit power) in the network, the corresponding weight coefficient is simply increased.

The embodiments described above are merely given as examples, and it should be understood that the present invention is not limited thereto. Further modifications, changes and improvements which retain the basic underlying principles disclosed and claimed herein are within the scope and spirit of the invention.

REFERENCES

[1] S. Lee and A. T. Campbell, "INSIGNIA: In-band signaling support for QoS in mobile ad hoc networks", in Proc. Of the 5$^{th}$ Intl. Workshop on Mobile Multimedia Communication, 1999.

[2] C. Perkins, E. M. Royer and S. R. Das, "Ad hoc on-demand distance vector routing", in Internet-Draft, draft-ietf-manet-aodv-06.txt, July 2000.

[3] D. Johnson and D. Maltz, "Dynamic source routing in ad hoc wireless networks", in Mobile Computing, Kluwer Academic Publ., 1996.

[4] S. Chen and K. Nahrstedt, "Distributed Quality-of-Service in ad hoc networks", IEEE JSAC, SAC-17(8), 1999.

[5] C. R. Lin, "Multimedia transport in multihop wireless networks", in IEEE Proc.-Commun., vol. 145, No. 5, October 1998.

[6] R. Nelson and L. Kleinrock, "Spatial TDMA: A collision free multihop channel access protocol," IEEE Trans. Commun., vol. COM-33, no. 9, pp. 934-944, September 1985.

[7] Lichun Bao and J. J. Garcia-Luna-Aceves, "Collision-Free Topology-Dependent Channel Access Scheduling",

[8] Grönkvist, J., "Traffic Controlled Spatial TDMA in multihop radio networks", PIMRC 98, October 1998.

[9] Grönkvist, J., "Assignment Methods for Spatial Reuse TDMA" MobiCom 00, Boston, Mass., August 2000.

[10] Y.-C. Hsu and T.-C. Tsai, "Bandwidth Routing in Multihop Packet Radio Environment", in Proceedings of the 3rdInternational Mobile Computing Workshop, March 1997.

[11] Y.-C. Hsu, T.-C. Tsai and Y.-D. Lin, "QoS Routing in Multihop Packet Radio Environment", in IEEE International Symposium on Computer Communications, Athens, Greece, June 1998.

[12] C.-R. Lin and J.-S. Liu, "QoS Routing in Ad hoc Wireless Networks", in IEEE JSAC, SAC-17(8), 1999.

[13] C.-R. Lin. "On-Demand QoS Routing in Multihop Mobile Networks,". In Proc. of IEEE INFOCOM, 2001.

[14] T.-W. Chen, J.-T. Tsai and M. Gerla, "QoS Routing Performance in Multihop, Multimedia, Wireless Networks", in Proc. of IEEE ICUPC, 1997.

[15] Y.-S. Chen et al., "On-Demand, Link-State, Multi-Path QoS Routing in a Wireless Mobile Ad-Hoc Network", To appear at IEEE European Wireless 2002: February 26-28, Florence, Italy (previously available at the Internet).

[16] W.-H. Liao et al., "A Multi-Path QoS Routing Protocol in a Wireless Mobile Ad Hoc Network", EEE Int'l Conf. on Networking (ICN), Vol. 2, pp. 158-167, 2001.

[17] W.-H. Liao, Y.-C. Tseng and K.-P. Shih, "A TDMA Based Bandwidth Reservation Protocol for QoS Routing in a Wireless Mobile Ad Hoc Network", to appear in ICC, 2002 (previously available at the Internet).

[18] A. Michail, "Routing and Scheduling Algorithms in Resource-limited Wireless Multi-hop Networks", PhD thesis, University of Maryland, College Park, 2000.

[19] C. Zhu, "Medium Access Control and Quality-of-Service Routing for Mobile Ad Hoc Networks", PhD thesis, University of Maryland, College Park, 2001.

[20] M. Sanchez, J. Zander, "Reuse Adaptive Routing for Multihop Packet Radio Networks", distributed through the Industrial Partnership Program hosted by the Radio Communication Systems group of KTH Royal Institute of Technology, Stockholm.

[21] International Patent Application with International Publication No. WO 02/05493 A2, Jan. 17, 2002.

[22] International Patent Application with International Publication No. WO 01/50669 A1, Jul. 12, 2001.

[23] U.S. Patent Application Publication No. US 2002/0049561 A1, Apr. 25, 2002.

[24] U.S. Patent Application Publication No. US 2002/0054578 A1, May 9, 2002.

[25] U.S. Patent Application Publication No. US 2002/0075869 A1, Jun. 20, 2002.

What is claimed is:

1. A method for connection set-up in a wireless communication network, said method comprising the steps of:

jointly determining, for the purpose of configuring a connection, values of a set of connection parameters including i) a path defined by a set of links, ii) at least one channel for each link, and iii) at least one physical link parameter, for optimization of the value of a single objective function with respect to said set of connection parameters, wherein said objective function depends on said set of connection parameters;

establishing a new connection based on the jointly determined values of said set of connection parameters, using the determined path for routing, the determined channel(s) for channel allocation and the determined physical link parameter value(s) for physical link adaptation, wherein said optimization includes a search procedure for finding a least cost $K_i$ to each node i, in a given set, from the source node according to the following optimization algorithm:

$$K_i = \min_{j \in N(i)} \left\{ \min_{m \in \{1, \ldots, M\}} \left\{ \min_{\psi} \{\kappa_i(j, m, \psi) + K(j)\} \right\} \right\}$$

$K_{Source\ ID}$=constant, where i≠Source ID, N(i) is a set of current neighbors of node i that in turn is a set of all nodes Ω in the network, j is a neighbor node belonging to N(i), m is a set of at least one channel in a set of M orthogonal channels in total, ψ is one or a multitude of physical layer parameters, $\kappa_i$ (j, m, ψ), also denoted $\kappa_{ij}$ (m, ψ), is the cost from node j to node i, and the term K(j), also denoted $K_j$, is the accumulated cost from the source node to node j, and $K_{Source\ ID}$ is the initial cost at the source node.

2. The method according to claim 1, wherein said communication network is a wireless multihop network.

3. The method according to claim 1, wherein said optimization is subjected to at least one constraint designed to ensure substantially non-colliding communication with respect to the new connection as well as existing connections.

4. The method according to claim 3, wherein said connection parameters are jointly determined under at least one interference-related constraint designed to ensure substantially non-interfering links, including the links of the new connection.

5. The method according to claim 1, wherein said at least one physical link parameter is selected from the group of:
transmit power;
adaptive antenna (AA) parameters;
multiple-input-multiple-output (MIMO) parameters;

modulation parameters;
bandwidth;
data rate; and
error correction parameters.

6. The method according to claim 1, wherein said optimization is performed by means of a heuristic algorithm.

7. The method according to claim 1, wherein said optimization is performed by means of a nested algorithm having nesting levels representing path assignment, channel allocation and physical link parameter adaptation, respectively.

8. The method according to claim 1, wherein said optimization includes minimization of an objective cost function with respect to all of said connection parameters.

9. The method according to claim 1, wherein a local search procedure is executed in each node i to evaluate the cost $\kappa_{ji}(m, \psi)$ from node j to node i for all nodes j in said set N(i) of neighbors, and the least cost $\kappa_i$ to each node i from the source node is determined based on said evaluation together with information on $K_j$ received from each node j.

10. The method according to claim 1, wherein the cost $\kappa_{ij}(m, \psi)$ includes a channel-dependent physical link parameter $\psi(m)$.

11. The method according to claim 1, wherein the cost $\kappa_{ij}(m, \psi)$ includes link transmit power $P_j(m)$ for node j.

12. The method according to claim 11, wherein the link transmit power $P_j(m)$ is subjected to constraints restricting the link transmit power to a predetermined interval.

13. The method according to claim 12, wherein the maximum permitted and minimum required link transmit power from node j are defined as:

$$\hat{P}_{\max j}(m) = \min \left\{ \min_{u \in N(j) \setminus \{i\}} \left\{ \frac{C_u(m)}{\gamma_m \cdot G_{ju}(m)} \right\}, \min_{r \in R} \left\{ \frac{\hat{C}_r(m)}{\gamma_m \cdot G_{jr}(m)} \right\} \right\}$$

$$\hat{P}_{\min j}(m) = \frac{1}{G_{ji}(m)} \cdot \left( \gamma_W \cdot W + \gamma_R \cdot \left( \sum_{v \in N(i) \setminus \{i\}} P_v(m) \cdot G_{vi}(m) + \sum_{r \in R} \hat{P}_r(m) \cdot G_{ri}(m) \right) \right),$$

where $\hat{P}_r(m)$ and $\hat{C}_r(m)$ indicates preliminary transmit and receive power, respectively, for node r within set R denoting nodes along the preliminary path connected to node j, $P_v(m)$ and $C_u(m)$ on the other hand indicates transmit and receive power, respectively, for nodes with established traffic, $\gamma_M$ is a mitigation factor, G(m) is a respective channel gain matrix, $\gamma_R$ is a receive factor, and W is a noise level using a factor $\gamma_W$ to ensure that one is generally interference limited rather than noise limited.

14. The method according to claim 12, wherein the maximum permitted and minimum required link transmit power from node j are defined as:

$$\hat{P}_{\max j}(m) = \min \left\{ \begin{array}{l} \min_{u \in N(j) \setminus \{i\}} \left\{ \frac{C_u(m) - \Gamma_M \cdot (I_u(m) + \hat{I}_u(m) + W)}{\Gamma_m \cdot G_{ju}(m)} \right\}, \\ \min_{r \in R} \left\{ \frac{\hat{C}_r(m) - \Gamma_M \cdot (I_r(m) + \hat{I}_r(m) + W)}{\Gamma_m \cdot G_{jr}(m)} \right\} \end{array} \right\}$$

-continued $$\hat{P}_{\min j}(m) = \frac{1}{G_{ji}(m)} \cdot \left( \gamma_W \cdot W + \gamma_R \cdot \left( \sum_{v \in N(i) \setminus \{i\}} P_v(m) \cdot G_{vi}(m) + \sum_{r \in R} \hat{P}_r(m) \cdot G_{ri}(m) \right) \right),$$

where $\hat{P}_r(m)$ and $\hat{C}_r(m)$ indicates estimated (or rather preliminary) transmit and receive power, respectively, for node r within set R denoting nodes along the preliminary path connected to node j, $P_v(m)$ and $C_u(m)$ on the other hand indicates transmit and receive power, respectively, for nodes with established traffic, G(m) is a respective channel gain matrix, $\Gamma_M$ is a CIR (Carrier Interference Ratio) threshold, assuming that each receiver part of an existing link or preliminary path experiences the interference level I(m), $\hat{I}_x(m)$ is the expected interference at node x from nodes along the preliminary path, $\gamma_R$ is a receive factor, and W is a noise level using a factor $\gamma_W$ ensure that one is generally interference limited rather than noise limited.

15. The method according to claim 1, further comprising the step of determining a preliminary shortest path prior to said optimization, and selecting said search region of node neighbors N(i) based on knowledge of said preliminary shortest path.

16. The method according to claim 1, wherein on-demand routing is deployed, having a Resource REQuest (RREQ) conveying path, channel and physical link parameters for a preliminary connection and having a Route REPly (RREP) confirming a selected connection.

17. The method according to claim 1, wherein on-demand routing is deployed, having a Resource REQuest (RREQ) collating information on existing connections when said RREQ is forwarded through the network, and determining, at a destination node, a new connection fulfilling a Quality of Service (QoS) requirement as contained in said RREQ based on said collated information.

18. A method for determining a new connection in a wireless communication network, said method comprising the step of jointly determining, for the purpose of configuring said connection, the values of a set of connection parameters including i) a path defined by a set of links, ii) at least one channel for each link, and iii) at least one physical link parameter, for optimization of the value of a single objective function with respect to said set of connection parameters, wherein said objective function depends on said set of connection parameters, wherein said optimization includes a search procedure for finding a least cost $K_i$ to each node i, in a given set, from the source node according to the following optimization algorithm:

$$K_i = \min_{j \in N(i)} \left\{ \min_{m \in \{1, \ldots, M\}} \left\{ \min_{\psi} \{\kappa_i(j, m, \psi) + K(j)\} \right\} \right\}$$

$K_{Source\ ID}$=constant;
where i≠Source ID, N(i) is a set of current neighbors of node i that in turn is a set of all nodes Ω in the network, j is a neighbor node belonging to N(i), m is a set of at least one channel in a set of M orthogonal channels in total, $\psi$ is one or a multitude of physical layer parameters, $\kappa_i(j, m, \psi)$, also denoted $\kappa_{ij}(m, \psi)$, is the cost from node j to node i, and the term K(j), also denoted $K_j$, is the accumulated cost from the source node to node j, and $K_{Source\ ID}$ is the initial cost at the source node.

19. The method according to claim 18, wherein said optimization is subjected to at least one constraint designed to ensure substantially non-colliding communication with respect to the new connection as well as existing connections.

20. A method for connection admission control in a wireless communication network, said method comprising the steps of:
performing, for a pending connection, optimization of the value of a single objective function with respect to a set of connection parameters including i) a path having a set of links, ii) at least one channel for each link, and iii) at least one physical link parameter, wherein said objective function depends on said set of connection parameters, and said optimization being subjected to at least one constraint designed to ensure substantially non-colliding communication with respect to the pending connection as well as existing connections,
wherein said optimization includes a search procedure for finding a least cost $K_i$ to each node i, in a given set, from the source node according to the following optimization algorithm:

$$K_i = \min_{j \in N(i)} \left\{ \min_{m \in \{1,\ldots,M\}} \left\{ \min_\psi \{\kappa_i(j, m, \psi) + K(j)\} \right\} \right\}$$

$K_{Source\ ID}$=constant,
where i≠Source ID, N(i) is a set of current neighbors of node i that in turn is a set of all nodes Ω in the network, j is a neighbor node belonging to N(i), m is a set of at least one channel in a set of M orthogonal channels in total, $\psi$ is one or a multitude of physical layer parameters, $\kappa_i$ (j, m, $\psi$), also denoted $\kappa_{ij}$ (m, $\psi$), is the cost from node j to node i, and the term K(j), also denoted $K_j$, is the accumulated cost from the source node to node j, and $K_{Source\ ID}$ is the initial cost at the source node;
rejecting said pending connection if no set of connection parameters can be determined without violating said constraint;
accepting said pending connection if a set of connection parameters can be determined without violating said constraint.

21. The method according to claim 20, wherein said at least one constraint includes an interference-related constraint designed to ensure substantially non-interfering links, including the links of the pending connection.

22. A control system for determining a connection in a wireless communication network, said control system comprising means for jointly determining, for the purpose of configuring said connection, values of a set of connection parameters including i) a path assembled by a set of links, ii) at least one channel for each link, and iii) at least one physical link parameter, for optimization of a single objective function with respect to said set of connection parameters, wherein said objective function depends on said set of connection parameters,
wherein said optimization includes a search procedure for finding a least cost $K_i$ to each node i, in a given set, from the source node according to the following optimization algorithm:

$$K_i = \min_{j \in N(i)} \left\{ \min_{m \in \{1,\ldots,M\}} \left\{ \min_\psi \{\kappa_i(j, m, \psi) + K(j)\} \right\} \right\}$$

$K_{Source\ ID}$=constant;
where i≠Source ID, N(i) is a set of current neighbors of node i that in turn is a set of all nodes Ω in the network, j is a neighbor node belonging to N(i), m is a set of at least one channel in a set of M orthogonal channels in total, $\psi$ is one or a multitude of physical layer parameters, $\kappa_i$ (j, m, $\psi$), also denoted $\kappa_{ij}$ (m, $\psi$), is the cost from node j to node i, and the term K(j), also denoted $K_j$, is the accumulated cost from the source node to node j, and $K_{Source\ ID}$ is the initial cost at the source node.

23. A control system for connection set-up in a wireless communication network, said control system comprising:
means for jointly determining, for the purpose of configuring a connection, values of a set of connection parameters including i) a path assembled by a set of links, ii) at least one channel for each link, and iii) at least one physical link parameter, for optimization of a single objective function with respect to said set of connection parameters, wherein said objective function depends on said set of connection parameters; and
means for establishing said connection based on the determined set of connection parameters, using the determined path for routing, the determined channel(s) for channel allocation and the determined physical link parameter value(s) for physical link adaptation,
wherein said optimization includes a search procedure for finding a least cost $K_i$ to each node i, in a given set, from the source node according to the following optimization algorithm:

$$K_i = \min_{j \in N(i)} \left\{ \min_{m \in \{1,\ldots,M\}} \left\{ \min_\psi \{\kappa_i(j, m, \psi) + K(j)\} \right\} \right\}$$

$K_{Source\ ID}$=constant;
where i≠Source ID, N(i) is a set of current neighbors of node i that in turn is a set of all nodes Ω in the network, j is a neighbor node belonging to N(i), m is a set of at least one channel in a set of M orthogonal channels in total, $\psi$ is one or a multitude of physical layer parameters, $\kappa_i$ (j, m, $\psi$), also denoted $\kappa_{ij}$ (m, $\psi$), is the cost from node j to node i, and the term K(j), also denoted $K_j$, is the accumulated cost from the source node to node j, and $K_{Source\ ID}$ is the initial cost at the source node.

24. A control system for connection admission control in a wireless communication network, said control system comprising:
means for performing, for a pending connection, optimization of the value of a single objective function with respect to a set of variable connection parameters including i) a path assembled by a set of links, ii) at least one channel for each link, and iii) at least one physical link parameter, wherein said objective function depends on said set of connection parameters, and said optimization being subjected to at least one constraint designed to ensure substantially non-colliding communication with respect to said pending connection as well as existing connections, wherein said optimization includes a search procedure for finding a least cost $K_i$ to each node i, in a given set, from the source node according to the following optimization algorithm:

$$K_i = \min_{j \in N(i)} \left\{ \min_{m \in \{1,...,M\}} \left\{ \min_\psi \{\kappa_i(j, m, \psi) + K(j)\} \right\} \right\}$$

$K_{Source\ ID}$=constant;

where i≠Source ID, N(i) is a set of current neighbors of node i that in turn is a set of all nodes Ω in the network, j is a neighbor node belonging to N(i), m is a set of at least one channel in a set of M orthogonal channels in total, ψ is one or a multitude of physical layer parameters, $\kappa_i$ (j, m, ψ), also denoted $\kappa_{ij}$ (m, ψ), is the cost from node j to node i, and the term K(j), also denoted $K_j$, is the accumulated cost from the source node to node j, and $K_{Source\ ID}$ is the initial cost at the source node.

means for rejecting the pending connection if no set of connection parameters can be determined without violating said constraint;

means for accepting the pending connection if a set of connection parameters can be determined without violating said constraint.

* * * * *

UNITED STATES PATENT AND TRADEMARK OFFICE
CERTIFICATE OF CORRECTION

PATENT NO.      : 7,339,897 B2
APPLICATION NO. : 10/278014
DATED           : March 4, 2008
INVENTOR(S)     : Larsson et al.

It is certified that error appears in the above-identified patent and that said Letters Patent is hereby corrected as shown below:

In Column 6, Line 38, delete "bow" and insert -- how --, therefor.

In Column 8, Line 16, delete "thee' and insert -- three --, therefor.

In Column 8, Line 22, delete "thee" and insert -- three --, therefor.

In Column 22, Line 44, delete "GAG" and insert -- CAC --, therefor.

In Column 27, Line 41, in Equation, in Claim 13, delete " $\sum_{v \in N(i) \setminus \{i\}} P_v(m)$ " and insert -- $\sum_{v \in N(i) \setminus \{j\}} P_v(m)$ --, therefor.

In Column 27, Lines 62-65, in Equation, in Claim 14, delete "
$$\min_{u \in N(j) \setminus \{i\}} \left\{ \frac{C_u(m) - \Gamma_M \cdot (I_u(m) + \hat{I}_u(m) + W)}{\Gamma_m \cdot G_{ju}(m)} \right\},$$
$$\min_{r \in R} \left\{ \frac{\hat{C}_r(m) - \Gamma_M \cdot (I_r(m) + \hat{I}_r(m) + W)}{\Gamma_m \cdot G_{jr}(m)} \right\}$$
"

and insert --
$$\min_{u \in N(j) \setminus \{i\}} \left\{ \frac{C_u(m) - \Gamma_M \cdot (I_u(m) + \hat{I}_u(m) + W)}{\Gamma_M \cdot G_{ju}(m)} \right\},$$
$$\min_{r \in R} \left\{ \frac{\hat{C}_r(m) - \Gamma_M \cdot (I_r(m) + \hat{I}_r(m) + W)}{\Gamma_M \cdot G_{jr}(m)} \right\}$$
--, therefor.

UNITED STATES PATENT AND TRADEMARK OFFICE
CERTIFICATE OF CORRECTION

PATENT NO. : 7,339,897 B2
APPLICATION NO. : 10/278014
DATED : March 4, 2008
INVENTOR(S) : Larsson et al.

It is certified that error appears in the above-identified patent and that said Letters Patent is hereby corrected as shown below:

In Column 28, Line 5, in Equation, in Claim 14, delete " $\sum_{v \in N(i) \setminus \{i\}}$ " and insert -- $\sum_{v \in N(i) \setminus \{j\}}$ --, therefor.

Signed and Sealed this

Fourth Day of November, 2008

JON W. DUDAS
*Director of the United States Patent and Trademark Office*